US011300208B2

United States Patent

Richie et al.

(10) Patent No.: US 11,300,208 B2
(45) Date of Patent: Apr. 12, 2022

(54) SEAL ASSEMBLY WITH ANTI-ROTATION AND STABILITY FEATURES

(71) Applicant: KALSI ENGINEERING INC., Sugar Land, TX (US)

(72) Inventors: Aaron P Richie, Missouri City, TX (US); Lannie L Dietle, Arnold, MD (US); Jeffrey D Gobeli, Houston, TX (US)

(73) Assignee: KALSI ENGINEERING, INC., Sugar Land, TX (US)

( * ) Notice: Subject to any disclaimer, the term of this patent is extended or adjusted under 35 U.S.C. 154(b) by 244 days.

(21) Appl. No.: 16/692,632

(22) Filed: Nov. 22, 2019

(65) Prior Publication Data

US 2020/0166140 A1 May 28, 2020

Related U.S. Application Data

(60) Provisional application No. 62/913,225, filed on Oct. 10, 2019, provisional application No. 62/917,187, filed on Nov. 26, 2018.

(51) Int. Cl.

*F16J 15/3244* (2016.01)
*F16J 15/16* (2006.01)

(Continued)

(52) U.S. Cl.

CPC ......... *F16J 15/3244* (2013.01); *F16J 15/164* (2013.01); *F16J 15/324* (2013.01);

(Continued)

(58) Field of Classification Search

CPC .... F16J 15/324; F16J 15/3236; F16J 15/3244; F16J 15/3268; F16J 15/164

See application file for complete search history.

(56) References Cited

U.S. PATENT DOCUMENTS 3,113,806 A * 12/1963 Cripe ......................... F16J 3/06 384/16
3,377,073 A 4/1968 Harney
(Continued)

FOREIGN PATENT DOCUMENTS

EP 0170928 A1 * 2/1986 ............. F16J 15/324
JP 3140756 B2 3/2001

OTHER PUBLICATIONS

International Search Report and Written Opinion for related PCT application PCT/US2019/062843 dated Mar. 17, 2020. (KAL132PCT).

*Primary Examiner* — Christine M Mills
*Assistant Examiner* — L. Susmitha Koneru
(74) *Attorney, Agent, or Firm* — Bracewell LLP; Douglas W. Rommelmann

(57) ABSTRACT

A rotary shaft sealing assembly having a rotatable shaft, a seal housing having a groove bore located radially outward of and facing the rotatable shaft, and a sealing element in sealing contact with the shaft and groove bore. The sealing element having seal body first and second ends and tangs extending axially from the seal body first end. A shelf member has an outer groove wall and a shelf defining an inner groove wall. The inner and outer groove walls providing axial support to the sealing element in certain conditions of assembly and operation. The seal housing or the shelf member providing restraints, with a portion of the restraints in circumferential alignment with the tangs and blocking rotation of the sealing element. The shelf, located radially between the shaft and the restraints, blocks and prevents loss of the restraints.

33 Claims, 13 Drawing Sheets

(51) Int. Cl.
*F16J 15/324* (2016.01)
*F16J 15/3212* (2016.01)
*F16J 15/3268* (2016.01)
*F16J 15/3236* (2016.01)

(52) U.S. Cl.
CPC ........ *F16J 15/3212* (2013.01); *F16J 15/3236* (2013.01); *F16J 15/3268* (2013.01)

(56) References Cited

U.S. PATENT DOCUMENTS 3,575,424 A 4/1971 Taschenberg
4,184,689 A 1/1980 Brodell et al.
4,372,400 A 2/1983 Beimgraben
4,610,319 A 9/1986 Kalsi
5,230,520 A * 7/1993 Dietle .................... E21B 4/003 277/559
5,374,068 A * 12/1994 Jewett .................... F16J 15/441 277/303
5,738,358 A * 4/1998 Kalsi .................... F16J 15/3224 277/544
5,873,576 A * 2/1999 Dietle .................. F16J 15/3244 277/559
6,036,192 A 3/2000 Dietle et al.
6,109,618 A 8/2000 Dietle
6,120,036 A 9/2000 Kalsi et al.
6,315,302 B1 11/2001 Conroy
6,334,619 B1 * 1/2002 Dietle .................... F16J 15/322 277/551
6,382,634 B1 5/2002 Dietle et al.
6,685,194 B2 2/2004 Dietle et al.
6,767,016 B2 7/2004 Gobeli et al.
7,052,020 B2 5/2006 Gobeli et al.
7,377,518 B2 5/2008 Lai
7,562,878 B2 7/2009 Dietle et al.
7,798,496 B2 9/2010 Dietle et al.
8,056,904 B2 11/2011 Dietle et al.
8,505,924 B2 8/2013 Dietle et al.
8,550,467 B2 10/2013 Dietle et al.
9,086,151 B2 7/2015 Dietle et al.
9,103,445 B2 8/2015 Schroeder et al.
9,121,503 B2 9/2015 Dietle et al.
9,121,504 B2 9/2015 Dietle et al.
10,302,200 B2 5/2019 Dietle
2005/0093246 A1 * 5/2005 Dietle .................. F16J 15/3244 277/549
2013/0199365 A1 * 8/2013 Gaertner ............... F04B 53/143 92/168
2013/0200573 A1 * 8/2013 Garrison .............. F16J 15/3412 277/457
2013/0241153 A1 * 9/2013 Garrison .................. F16J 15/40 277/350
2014/0175755 A1 * 6/2014 Luchs .................... F16J 15/064 277/500

* cited by examiner 2
4
5
6
8
10
12
14
16
18
20
22
24
26
28
30
32
34
36
38
40
42
44
46
47
48
50
52
53
54
56
57
58
66
68
70
72
74
76
78
80
82
83
84
85
87

80
5
26
78
20
70
58
62
4
50
76
54
32
64
60
74
66
72
84
52
28
48
22

2
6
4
22
80
32
48
54
57
56
8
24
46
36
34
30
44
50
52
26
12
58
40
53
5
28
38
14
18
10
70
76
72
74
68
20
66
84
78
47
42
16

2
98
96
102
88
94
90
92
18
16
12
28
4
6
74
30
66
26
32
14
86
36
44
8
10

2
98
96
88
102
94
90
18
16
114
12
28
4
6
110
74
30
112
66
26
32
14
86
36
44
8
10

SEAL ASSEMBLY WITH ANTI-ROTATION AND STABILITY FEATURES

CROSS-REFERENCE TO RELATED APPLICATIONS

This application claims the benefit of U.S. Provisional Application Ser. No. 62/917,187 filed on Nov. 26, 2018, by Aaron Paul Richie and Lannie Laroy Dietle, entitled "Seal Assembly with Anti-rotation and Stability Features." This application also claims the benefit of U.S. Provisional Application Ser. No. 62/913,225 filed on Oct. 10, 2019, by Aaron Paul Richie and Lannie Laroy Dietle and entitled "Seal Assembly with Anti-rotation and Stability Features." Applicants incorporate by reference herein Application Ser. No. 62/917,187 and Application Ser. No. 62/913,225 in their entireties.

BACKGROUND OF THE INVENTION

1. Field of the Invention

The present invention relates generally to rotary seals for establishing sealing between relatively rotatable machine components and separating a first fluid from a second fluid. More specifically, the present invention is a rotary shaft sealing assembly that supports a sealing element during assembly onto the shaft, and when exposed to reversing pressure, and prevents the sealing element from rotating with the shaft.

2. Description of the Related Art

Assignee Kalsi Engineering, Inc. is the owner of numerous patents on hydrodynamic seal designs for various applications providing a seal between relatively rotatable machine components and separating a first fluid from a second fluid. Oftentimes, the seal is between a rotatable shaft and a housing, typically stationary, with the first fluid acting on a first side of the seal and the second fluid acting on a second side of the seal. Preferably, one of the fluids is a lubricant.

Typically, a hydrodynamic seal has a hydrodynamic lip with a dynamic sealing surface which forms a seal with a sealing surface of the shaft when there is no relative rotatable movement between the shaft and the housing. Preferably, when the shaft rotates relative to the housing, the hydrodynamic seal remains stationary and a thin film of the lubricant will pass through the dynamic sealing interface between the dynamic sealing surface of the hydrodynamic lip and the sealing surface of the rotatable shaft to minimize wear and heat generation. As the thin film of lubricant passes through the dynamic sealing interface, it typically becomes a small trace part of the fluid it leaks into.

Many factors must be considered in the design of rotary shaft sealing assemblies and will significantly impact the performance of the sealing assemblies. Such factors include, for example, differences of the thermal expansion of the seal element relative to the housing; thermal expansion of the fluids; pressure differences between the first and second fluids, support for the hydrodynamic sealing element during assembly onto the shaft; prevention of the sealing element from rotating with the shaft; and reversing pressures of the first and second fluids acting on the sealing element, to name a few.

Commonly assigned U.S. Pat. Nos. 7,798,496 and 8,505,924 ("the '496 and '924 patents") disclosed the use of anti-rotation projections or tangs for engaging mating recesses within a housing to prevent seal slippage and rotation within housing. However, in situations where the pressure of the second (non-lubricant) fluid is greater than the pressure of the lubricant in the lubricant-filled region, the seal in the vicinity of the projection is not supported, and could be significantly damaged in the '496 and '924 patents.

Additionally, in the '496 and '924 patents, the projection is attached to the seal body very near the inner periphery of the seal body, which the present inventors now believe may cause distortion of the exclusionary circular edge as the projection reacts seal torque to the housing, and may inhibit the ability of the circular edge to follow runout related lateral shaft motion.

In the '496 and '924 patents, the seal body end nearest the exclusionary circular edge is held against a groove wall by differential pressure, and the resulting friction between that seal body end and the groove wall inhibits radial slippage between the seal body end and the groove wall, which inhibits the ability of the circular edge to follow runout-related radial motion of the shaft.

In the '496 and '924 patents, the exclusionary circular edge is located at a relatively small extrusion gap clearance between the housing and the shaft. This exposes the circular edge to fluctuating hydraulic pressure related to changes in the extrusion gap clearance due to runout of the shaft, and this fluctuating hydraulic pressure makes the circular edge less able to exclude contaminants from the dynamic sealing interface.

In the prior art, circumferential contact between the projection and the seal housing occurs at the sharp knife-like intersection between the lubricant port and the lubricant-side wall of the seal groove, making it more likely that the projection will become damaged or sheared away as a result of seal torque.

It is desirable to provide a rotary shaft sealing assembly that overcomes some or all of the above-mentioned shortcomings of the prior art.

SUMMARY OF THE INVENTION

A preferred embodiment of the present invention is a rotary shaft sealing assembly that preferably includes a rotatable shaft having a sealing surface of generally cylindrical form facing generally radially outward. The rotary shaft sealing assembly also preferably includes a seal housing of annular form located radially outward of and encircling the rotatable shaft. The seal housing preferably has a groove bore facing generally radially inward toward and encircling at least a portion of the sealing surface.

The rotary shaft sealing assembly preferably has a sealing element that is located radially between, and has sealing contact with, the sealing surface and the groove bore. The sealing element preferably has a seal body of annular form that has seal body first and second ends facing in generally opposite directions away from one other. The sealing element preferably has a dynamic sealing surface of annular form situated in axially intermediate location to the seal body first end and the seal body second end. The dynamic sealing surface preferably faces generally radially inward toward and encircles the sealing surface. Preferably, the sealing contact between the sealing element and the sealing surface of the rotatable shaft is established by the dynamic sealing surface of the sealing element. The sealing element preferably has a static sealing surface of annular form situated in axially intermediate location to the seal body first end and the seal body second end that faces generally radially outward away from the dynamic sealing surface and encircles at least a portion of the dynamic sealing surface. The seal body first end preferably has an inner peripheral edge and an outer peripheral edge that is located radially outward from the inner peripheral edge.

The sealing element preferably has at least one tang projecting from the seal body first end in a generally axial direction away from the seal body second end. The at least one tang preferably has an outer peripheral surface facing in a generally radially outward direction away from the rotatable shaft, and an inner peripheral surface facing in a generally radially inward direction toward the rotatable shaft. The at least one tang preferably has a first circumferential end facing in a generally circumferential direction and a second circumferential end facing in a generally opposite circumferential direction. The sealing element preferably has a first end fillet located between and adjacent to the first circumferential end and the seal body first end and providing a smooth blended transition between the first circumferential end and the seal body first end. The sealing element preferably has a second end fillet located between and adjacent to the second circumferential end and the seal body first end and providing a smooth blended transition between the second circumferential end and the seal body first end. Preferably the at least one tang is situated in intermediate radial relation to the dynamic sealing surface and the static sealing surface and is situated nearer to the outer peripheral edge than to the inner peripheral edge.

The rotary shaft sealing assembly preferably has at least one restraint, such as a pin, having a portion thereof in circumferential alignment with the tang and blocking rotation of the sealing element. If desired, the at least one restraint may have a portion located within an at least one mounting hole in the seal housing or the shelf member.

The rotary shaft sealing assembly preferably has a shelf member located radially outward of the rotatable shaft. The shelf member preferably has a shelf located radially between the rotatable shaft and the at least one restraint and located radially between the rotatable shaft and the at least one tang. Preferably, the shelf has a shelf outer surface facing generally radially outward toward the inner peripheral surface of the at least one tang and facing generally toward the at least one restraint and blocking disengagement of the at least one restraint from the at least one mounting hole, and preventing the restraint from contacting the rotatable shaft.

The at least one restraint is typically a plurality of pins arranged in a circular pattern and the at least one tang is typically a plurality of tangs arranged in a circular pattern, and a portion of each pin is situated circumferentially between one tang and another tang.

Preferably, the shelf has an inner groove wall facing in a generally axial direction toward the seal body first end and the shelf member has an outer groove wall facing in a generally axial direction toward the seal body first end and toward the at least one tang and toward the at least one restraint. Preferably, the seal body first end and the inner groove wall face in generally opposite directions and toward one another, the inner groove wall and the outer groove wall face in the same general direction, and the outer groove wall is more distant than the inner groove wall from the seal body first end.

Preferably, a corner break is located between and adjacent to the shelf outer surface and the inner groove wall. Preferably, the inner peripheral surface of the at least one tang is blended to the seal body first end by a tang fillet located between and adjacent to the inner peripheral surface and the seal body first end and the corner break faces generally toward the tang fillet.

Preferably, the at least one tang has an axial tang end facing in a generally axial direction toward the outer groove wall and the outer groove wall faces generally toward the axial tang end.

Preferably, the shelf member has a pilot surface facing radially outward toward and encircled by and adjoining the seal housing and locating the seal housing and the shelf member radially with respect to one another. Preferably, the groove bore faces toward, encircles, and adjoins the pilot surface.

Preferably, the shelf member has a shelf member indexing surface facing in a generally axial direction toward the seal housing and the seal housing has a housing indexing surface facing in a generally axial direction toward the shelf member, the housing indexing surface and the shelf member indexing surface facing in generally opposite directions toward one another and abutting one another and locating the seal housing and the shelf member axially with respect to one another.

Preferably, the sealing element has an inlet curvature of generally convex form that is adjacent to at least a portion of the dynamic sealing surface. If desired, at any axial cross-section of the sealing element, the inlet curvature may be situated in intermediate relation to the dynamic sealing surface and the seal body second end, and the inlet curvature being more distant than the dynamic sealing surface from the seal body first end and from the shelf. In such an arrangement, the sealing element may incorporate an angled transitional geometry located between and adjacent to the seal body first end and the dynamic sealing surface, the angled transitional geometry being closer than the dynamic sealing surface to the shelf. Alternately, if desired, at any axial cross-section of the sealing element, the inlet curvature may be situated in intermediate relation to the dynamic sealing surface and the seal body first end, and the inlet curvature being closer than the dynamic sealing surface to the seal body first end and to the shelf.

If desired, a static seal can be used to provide sealing between the seal housing and the shelf member.

Preferably, the seal housing has a housing groove wall facing in a generally axial direction toward and abutting and providing support to the seal body second end, and facing toward the seal body first end, the at least one tang, and the at least one restraint.

Preferably, the sealing element partitions a first fluid having a pressure from a second fluid having a pressure, the pressure of the first fluid being greater than the pressure of the second fluid. Preferably the seal body first end, the at least one tang, the at least one restraint, and the shelf are exposed to the first fluid.

BRIEF DESCRIPTION OF THE SEVERAL VIEWS OF THE DRAWINGS

The invention is better understood by reading the detailed description of embodiments which follows and by examining the accompanying drawings, in which.

DESCRIPTION OF THE PREFERRED EMBODIMENTS

Introduction

Features throughout this specification that are represented by like numbers have the same function.

In this specification, the definition of the words “adjoin”, “adjoins”, and “adjoining” includes the commonly accepted “adjoin” definition “to be close to or in contact with one another” that is provided by the Merriam-Webster online dictionary for the word “adjoin”. In this specification, the word “intermediate” has the ordinary dictionary meaning of, “occurring in the middle of a . . . series” (Merriam-Webster’s Learner’s Dictionary). Although these definitions are provided herein, they are not examples of the inventors being their own lexicographers, since the referenced definitions are commonly understood and accepted definitions.

Figure 1:
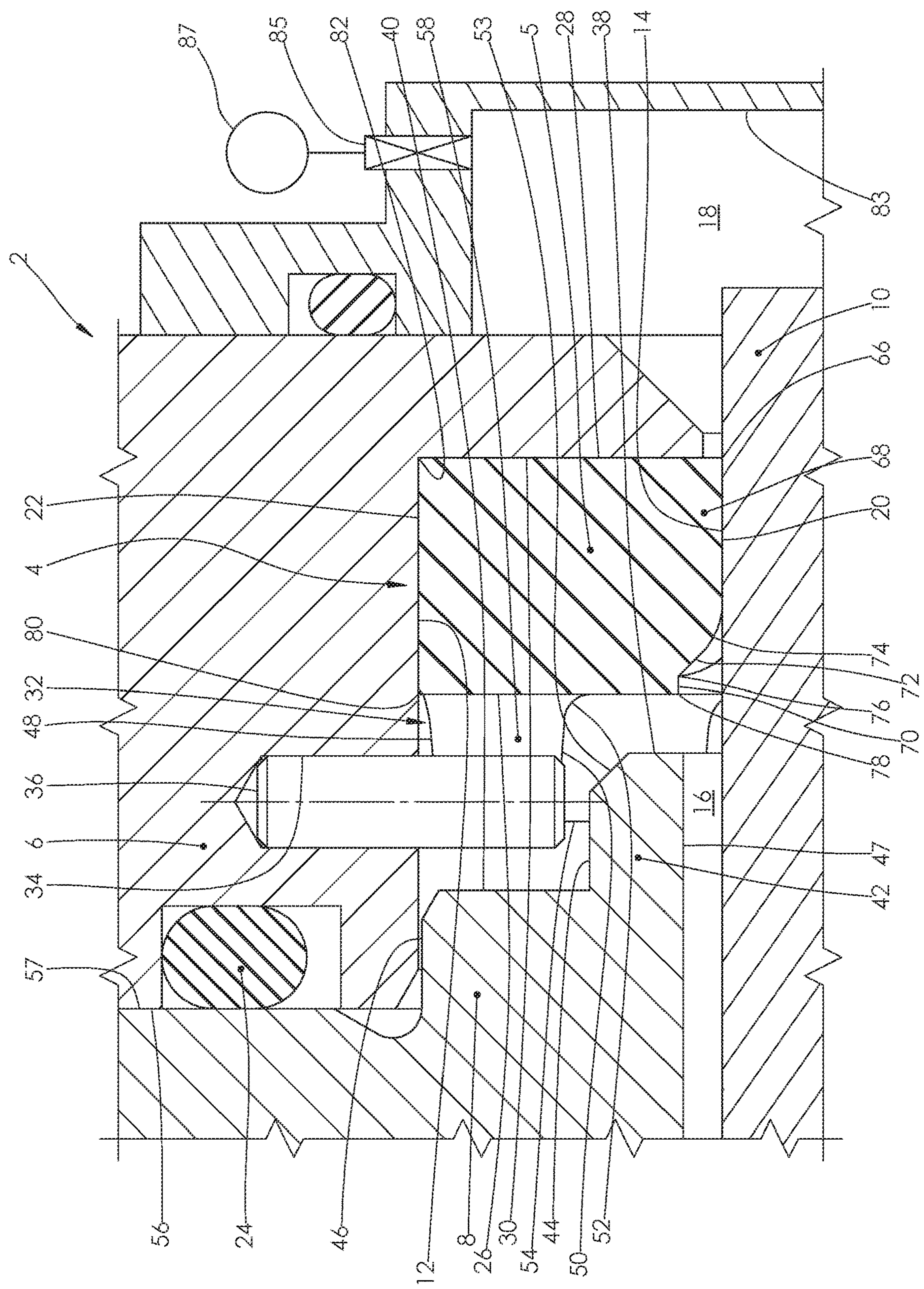
FIG. 1 is a fragmentary cross-sectional view of a rotary shaft sealing assembly according to a preferred embodiment of the present invention.
Figure 5:
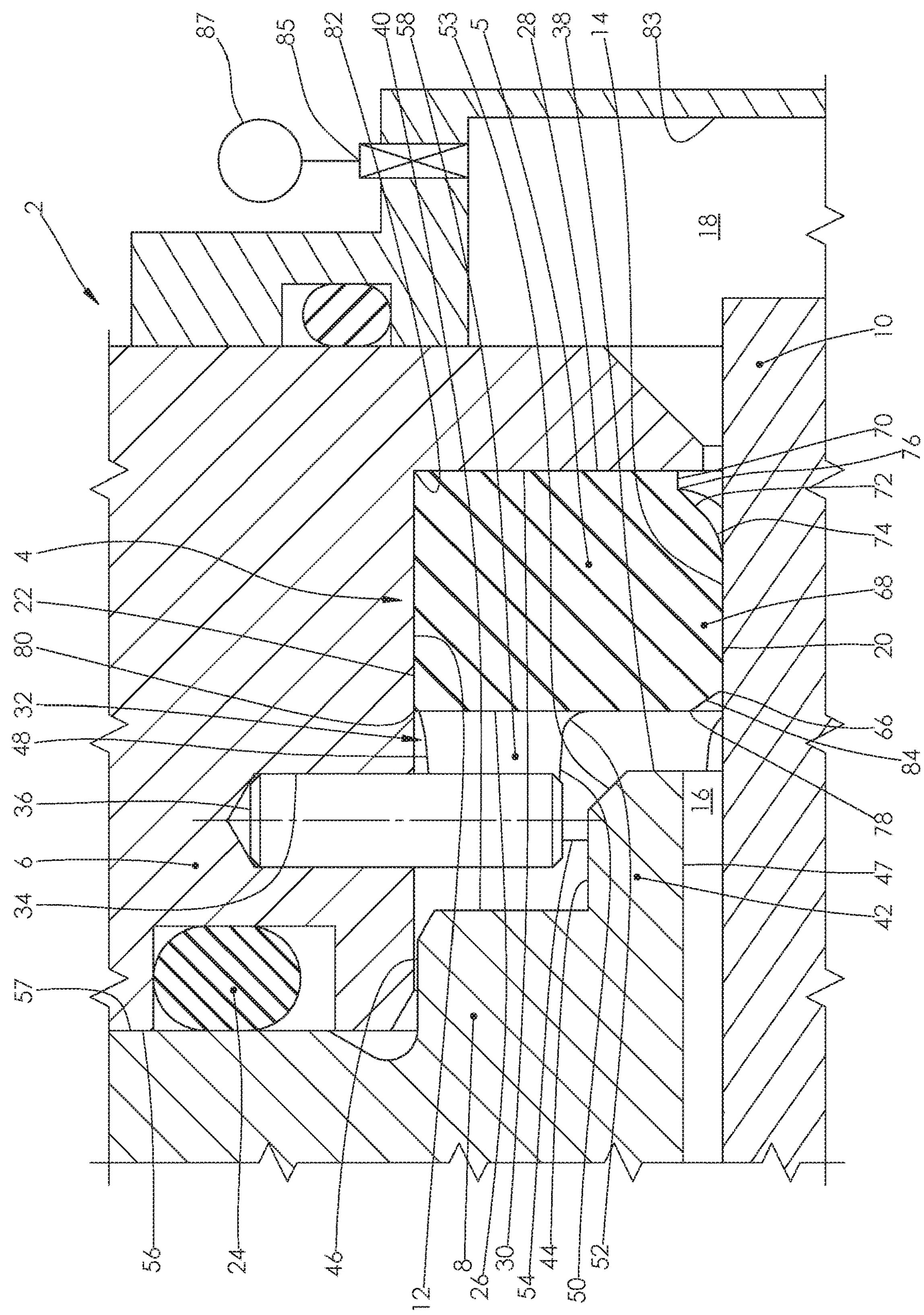
FIG. 5 is a fragmentary cross-sectional view of a rotary shaft sealing assembly according to a second preferred embodiment of the present invention.

Description of FIGS. 1 and 5

FIG. 1 is a fragmentary cross-sectional view of a preferred rotary shaft sealing assembly that is shown generally at 2. FIG. 5 is a fragmentary cross-sectional view of another preferred rotary shaft sealing assembly that is shown generally at 2. The following description applies to both FIG. 1 and FIG. 5.

A sealing element 4 having a seal body 5 of annular form is located axially between a seal housing 6 and a shelf member 8 and is located radially between a portion of the seal housing 6 and a portion of a rotatable shaft 10. The rotatable shaft 10 may have relative rotation with respect to the sealing element 4, the seal housing 6, and the shelf member 8. One objective of the invention is to prevent the sealing element 4 from rotation with the rotatable shaft 10.

The sealing element 4 may be composed of one or more seal materials without departing from the spirit or scope of the invention and may be composed of any suitable sealing material or combination of materials, including elastomeric and plastic materials. The sealing element 4 may be of monolithic integral, one-piece construction or may also incorporate different materials bonded together, chemically cross-linked together, or inter-fitted together to form a composite structure.

The sealing element 4, being a generally circular ring, defines a theoretical axis. While the theoretical axis is not illustrated, the term “axis” is well-understood in the art, and in the field of drafting is sometimes illustrated using a centerline. For orientation purposes, it should be understood that in all of the cross-sectional views herein, the cutting plane of the cross-section is aligned with and passes through the theoretical axis of the sealing element 4; i.e., the theoretical centerline lies on the cutting plane. In other words, all of the cross-sectional views herein are longitudinal section views. The circumferential direction of relative rotation is normal (perpendicular) to the plane of the cross-section, and the theoretical axis of sealing element 4 generally coincides with the axis of relative rotation.

Preferably, the sealing element 4 is located between, radially compressed between, and establishes sealing contact with a groove bore 12 of the seal housing 6 and a sealing surface 14 of the rotatable shaft 10 and partitions a first fluid 16 from a second fluid 18. More specifically, a dynamic sealing surface 20 of the sealing element 4 preferably establishes the sealing contact with the sealing surface 14 of the rotatable shaft 10, and a static sealing surface 22 of the sealing element 4 preferably establishes sealing contact with the groove bore 12 of the seal housing 6.

For purposes of this specification, the term “fluid” has its broadest meaning, encompassing both liquids and gases. If desired, a static seal 24 may be used to provide sealing between the seal housing 6 and the shelf member 8. In some situations, the static seal 24 is not necessary. For example, in some situations the seal housing 6 may have a sealed relationship with some other component that the seal housing 6 and shelf member 8 are located within, and in some circumstances that sealed relationship would eliminate the need for the static seal 24. This is not the only situation where the static seal 24 is not required.

Preferably, a seal body first end 26 of the sealing element 4 faces in a generally axial direction toward the shelf member 8, and a seal body second end 28 of the sealing element 4 faces in a generally axial direction away from the shelf member 8 and faces in a generally axial direction toward and may adjoin a housing groove wall 30 of the seal housing 6.

Preferably, at least one (i.e., one or more) tang 32 projects from the seal body first end 26 in a generally axial direction, projecting generally away from the seal body second end 28 and housing groove wall 30 and generally toward the shelf member 8. In most cases more than one tang 32, arranged in a circular pattern, will be used. With very small diameter seals, it is possible that only one tang 32 would be used due to space constraints.

Preferably, the assembly has at least one restraint 36, such as the generally cylindrical pin that is shown, which, through interaction with the tang 32, prevents (i.e., blocks) the sealing element 4 from rotating with the rotatable shaft 10. In most cases more than one restraint 36, arranged in a circular pattern, will be used. With very small diameter seals, it is possible that only one restraint 36 would be used due to space constraints.

Preferably, at least one mounting hole 34 is formed in the seal housing 6. In most cases more than one mounting hole 34, arranged in a circular pattern, will be used. With very small diameter seals, it is possible that only one mounting hole 34 would be used due to space constraints. Preferably, each mounting hole 34 is situated in a generally radial orientation, as illustrated. Preferably, each mounting hole 34 has an end facing radially inward toward the rotatable shaft 10. Although the mounting hole 34 is shown as a blind hole (i.e., one that does not pass completely through the seal housing 6), arrangements are possible where the mounting hole 34 is a through hole that does pass completely through to the outer peripheral surface (not shown here) of the seal housing 6.

Preferably, each restraint 36 is located by and secured partially within a mating mounting hole 34. In other words, preferably, there is at least one restraint having a portion thereof located within the at least one mounting hole 34.

Preferably, each restraint 36 and mounting hole 34 is generally radially oriented. Each restraint 36 is preferably retained within its mating mounting hole 34 by friction produced by an interference fit between the restraint 36 and the mounting hole 34. The seal housing 6, shelf member 8, rotatable shaft 10, and restraint 36 are preferably made at least in part from metal, and the sealing surface 14 preferably has a coating or treatment to enhance hardness. The hardness enhancement is typically a tungsten carbide coating.

Although any suitable type of pin can be used as the restraint 36, the preferred pin type is known as a grooved pin. Grooved pins have a longitudinal groove that creates displaced metal that produces interference and friction with the mounting hole 34 when installed. Grooved pins are preferred over dowel pins because grooved pins are compatible with a larger diameter tolerance on the mounting hole 34. Dowel pins, coiled spring pins, and roll pins (also known as slotted spring pins) are other examples of pins that are suitable for use as the restraint 36.

The sectional views herein are intended to be interpreted by the standard conventions of multi and sectional view orthographic drawing projection practiced in the United States and described in ANSI Y14.3-1975, an industry standardization document promulgated by ASME. ANSI Y14.3-1975 has been interpreted to mean that the restraint 36 should not be sectioned because a groove pin has no internal detail to be conveyed.

Preferably, each restraint 36 has a portion thereof that is circumferentially aligned with at least one tang 32 and through interaction with the tang 32 prevents (i.e., blocks) the sealing element 4 from rotating with the rotatable shaft 10. Preferably, in the typical assembly with more than one restraint 36 and more than one tang 32, each restraint 36 is located circumferentially between a first and a second tang 32, and each tang 32 is located circumferentially between a first and a second restraint 36, and there are as many of the restraint 36 as there are of the tang 32. In other words, preferably, in the typical case where there is more than one tang 32 and more than one restraint 36, a portion of each tang 32 is situated in circumferentially intermediate location to a pair of restraints 36 and a portion of each restraint 36 is situated in circumferentially intermediate location to a pair of tangs 32.

Preferably, the housing groove wall 30 faces in a generally axial direction toward and adjoining (and typically abutting) the seal body second end 28, and faces toward the seal body first end 26, the at least one tang 32, and the at least one restraint 36.

Preferably, the shelf member 8 defines a shelf 42 that is an annular feature projecting in an axial direction toward the sealing element 4 and the housing groove wall 30. Preferably, the shelf member 8 has an inner groove wall 38 and an outer groove wall 40 that are axially offset from one another. Preferably, the inner groove wall 38 is an end surface of the shelf 42 and faces in a generally axial direction toward the seal body first end 26 and housing groove wall 30. Preferably, the outer groove wall 40 faces in a generally axial direction toward each restraint 36 and each tang 32 and faces in a generally axial direction toward the seal body first end 26 and the housing groove wall 30. Preferably, a shelf outer surface 44 of the shelf 42 faces radially outward toward each restraint 36, preventing each restraint 36 from disengaging from its mating mounting hole 34. Preferably, the housing groove wall 30, inner groove wall 38, and outer groove wall 40 are substantially planar (i.e., substantially flat) surfaces.

The sealing element 4 is illustrated in the axial position it attains when the pressure of the first fluid 16 is greater than the pressure of the second fluid 18. Preferably, at least a portion of the seal body second end 28 is supported by the housing groove wall 30 when the pressure of the first fluid 16 is greater than the pressure of the second fluid 18. The seal body second end 28 is also supported by the housing groove wall 30 if the sealing element 4 is being installed onto the rotatable shaft 10 from right to left.

Preferably, the seal body first end 26 is supported by the inner groove wall 38 if the pressure of the second fluid 18 is greater than the pressure of the first fluid 16. Preferably, the seal body first end 26 is also supported by the inner groove wall 38 if the sealing element 4 is being installed onto the rotatable shaft 10 from left to right, preventing significant installation-related cross-sectional twisting of the sealing element 4. This stabilizing benefit helps to ensure proper installation and helps to minimize pressure induced distortion of the sealing element 4.

Preferably, each of the at least one tang 32 are supported by the outer groove wall 40 if the pressure of the second fluid 18 is greater than the pressure of the first fluid 16. The tangs 32 may also be supported by the outer groove wall 40 if the sealing element 4 is being installed onto the rotatable shaft 10 from left to right. This stabilizing benefit helps to ensure proper installation and helps to minimize pressure induced distortion of the sealing element 4.

Preferably, the shelf member 8 has a pilot surface 46 that faces radially outward toward and adjoining the groove bore 12 and locates the shelf member 8 and the groove bore 12 laterally with respect to one another, ensuring good alignment between the shelf member 8 and the seal housing 6. Preferably, the shelf member 8 and the seal housing 6 are generally concentric with each other as a result of this piloted relationship. Preferably, at least part of the pilot surface 46 is located radially inward from and within (i.e., inside of) a portion of the groove bore 12. Preferably, the shelf member 8 has a shelf bore 47 that faces generally radially inward toward and encircles a portion of the rotatable shaft 10.

Preferably, each tang 32 has an outer peripheral surface 48 that faces generally radially outward toward the groove bore 12 and away from the sealing surface 14 and the rotatable shaft 10. Preferably each tang 32 has an inner peripheral surface 50 that faces generally radially inward away from the groove bore 12 and generally toward the shelf 42, the shelf outer surface 44, the rotatable shaft 10 and the sealing surface 14. Preferably, the outer peripheral surface 48 and inner peripheral surface 50 face in generally radially opposite directions, away from one another. Preferably, the inner peripheral surface 50 is blended to the seal body first end 26 with a tang fillet 52 that is generally concave, as can be seen in the longitudinal cross-sections of FIGS. 1 and 5. One purpose of the tang fillet 52 is to increase the contact area between the tang 32 and the annular portion of the sealing element 4 that the tang 32 projects from, to reduce seal torque-induced stress at the root of the tang 32 (i.e., to reduce shear stress at the interface between the tang 32 and the seal body 5). This helps to prevent the tang 32 from tearing loose from the remainder of the sealing element 4. Preferably, the tang fillet 52 is located between and adjacent to the inner peripheral surface 50 and the seal body first end 26 and provides a smooth blended transition between the inner peripheral surface 50 and the seal body first end 26. In other words, preferably the tang fillet 52 blends between the inner peripheral surface 50 and the seal body first end 26.

Preferably, the shelf 42 incorporates a corner break 53 between the shelf outer surface 44 and the inner groove wall 38 to provide clearance for the tang fillet 52 in circumstances where the seal body first end 26 is forced into contact with the inner groove wall 38. Preferably, the corner break 53 geometry is selected from a group consisting of chamfers and rounds, the term "round" having the common industrial meaning of a rounded external corner. Preferably, the corner break 53 is located between and adjacent to the shelf outer surface 44 and the inner groove wall 38. Preferably, the corner break 53 faces generally toward the tang fillet 52.

Preferably each of the tangs 32 has a first circumferential end 58 that faces in a generally circumferential direction toward a restraint 36. Preferably, each tang 32 has an axial tang end 54 that faces in generally the same axial direction as the seal body first end 26. The axial tang end 54 faces generally toward the outer groove wall 40 and may abut the outer groove wall 40 in circumstances where the pressure of the second fluid 18 is greater than the pressure of the first fluid 16. Preferably, the axial tang end 54 is generally planar (i.e., flat).

Preferably, each tang 32 has an axial length defined by the distance from the axial tang end 54 to the seal body first end 26 and the shelf 42 has an axial length defined by the distance from the inner groove wall 38 to the outer groove wall 40. Preferably, the tang axial length and the shelf axial length are the same or substantially the same so that the inner groove wall 38 and the outer groove wall 40 may provide support to the seal body first end 26 and the axial tang end 54, respectively, concurrently under certain operating and installation conditions.

Preferably, the seal housing 6 has a housing indexing surface 56 of generally planar form that faces in a generally axial direction toward the shelf member 8. Preferably, the shelf member 8 has a shelf member indexing surface 57 of generally planar form that faces in a generally axial direction toward and abuts the housing indexing surface 56 of the seal housing 6. Preferably, the contact between the housing indexing surface 56 and the shelf member indexing surface 57 locates the seal housing 6 and the shelf member 8 axially with respect to one another. Preferably, the housing indexing surface 56 and the shelf member indexing surface 57 face in generally opposite directions toward each other.

Preferably, the dynamic sealing surface 20 is annular. Preferably, the dynamic sealing surface 20 terminates at an exclusionary corner 66 that is generally circular and is an external corner. Preferably, the dynamic sealing surface 20 varies in axial width around the circumference of the sealing element 4.

Preferably, the dynamic sealing surface 20 is an inner peripheral surface of a dynamic sealing lip 68 that projects radially inward from an inner body surface 70 of the sealing element 4. Preferably, the dynamic sealing lip 68 has an angled flank 72 that is situated in axially intermediate relation to the inner body surface 70 and the dynamic sealing surface 20 at any axial cross-section of the sealing element 4.

Preferably, the dynamic sealing lip 68 has an inlet curvature 74 of generally convex form that is situated in axially intermediate location to the angled flank 72 and the dynamic sealing surface 20 at any axial cross-section of the sealing element 4. Preferably, the inlet curvature 74 is located adjacent to and abuts the angled flank 72. Preferably, as a result of the varying axial width of the dynamic sealing surface 20, the dynamic sealing surface 20 has a wavy edge and the inlet curvature 74 is located adjacent to and abuts at least a portion of the wavy edge of the dynamic sealing surface 20. In other words, the inlet curvature 74 is preferably adjacent to at least a portion of the dynamic sealing surface 20, and the dynamic sealing surface 20 is preferably adjacent to at least a portion of the inlet curvature 74. Preferably, the dynamic sealing surface 20 encircles and adjoins the sealing surface 14 of the rotatable shaft 10, contacting the rotatable shaft 10 in the absence of relative rotation, and generally separated from the rotatable shaft 10 by a very thin film during periods of relative rotation.

Preferably, the axial distance between the inlet curvature 74 and the exclusionary corner 66 varies around the circumference of the sealing element 4. Preferably, the axial distance between the inlet curvature 74 and the seal body second end 28 varies around the circumference of the sealing element 4. Preferably, the axial distance between the inlet curvature 74 and the housing groove wall 30 varies around the circumference of the sealing element 4. Preferably, the axial distance between the inlet curvature 74 and the seal body first end 26 varies around the circumference of the sealing element 4. Preferably, the inlet curvature 74 provides a smooth blend between the dynamic sealing surface 20 and the angled flank 72. Preferably, the inlet curvature 74 follows a wavy path around the circumference of the sealing element 4 as it follows the wavy edge of the dynamic sealing surface 20.

Preferably, the angled flank 72 terminates at a wavy intersection 76 with the inner body surface 70. Preferably, the angled flank 72 is angulated with respect to the dynamic sealing surface 20 and with respect to the inner body surface 70. Preferably, the axial distance between the angled flank 72 and the exclusionary corner 66 varies around the circumference of the sealing element 4. Preferably, the axial distance between the angled flank 72 and the seal body second end 28 varies around the circumference of the sealing element 4. Preferably, the axial distance between the angled flank 72 and the housing groove wall 30 varies around the circumference of the sealing element 4. Preferably, the axial distance between the angled flank 72 and the seal body first end 26 varies around the circumference of the sealing element 4.

The dynamic sealing surface 20, angled flank 72, and inlet curvature 74 of the dynamic sealing lip 68 of the sealing element 4 preferably form hydrodynamic waves. The dynamic sealing lip 68 may incorporate the hydrodynamic waves taught by any the following commonly assigned U.S. patents, which are incorporated herein for all purposes: U.S. Pat. Nos. 4,610,319, 5,230,520, 5,738,358, 5,873,576, 6,036,192, 6,109,618, 6,120,036, 6,315,302, 6,334,619, 6,382,634, 6,685,194, 6,767,016, 7,052,020, 7,562,878, 8,056,904, 8,550,467, 9,086,151, 9,103,445, 9,121,503, 9,121,504, and 10,302,200.

Preferably, the seal body first end 26 has an inner peripheral edge 78 of annular form and an outer peripheral edge 80 of annular form. Preferably, the outer peripheral edge 80 is annular and is located radially outward from and encircles the inner peripheral edge 78. Preferably, the inner peripheral edge 78 is annular and is located radially inward from and encircled by the outer peripheral edge 80.

Preferably, the at least one tang 32 is situated in intermediate radial relation to and between the inner peripheral edge 78 and the outer peripheral edge 80. Preferably, the at least one tang 32 is located closer (i.e., nearer) to the outer peripheral edge 80 than it is to the inner peripheral edge 78. Another way of saying this is that preferably, the outer peripheral edge 80 is nearer than the inner peripheral edge 78 to the at least one tang 32.

This outward radial placement of the at least one tang 32 accomplishes several things. First, this outward radial placement of the tang 32 allows the exclusionary corner 66 to more effectively exclude abrasive particulate matter from the sealing interface between the dynamic sealing surface 20 and the sealing surface 14. We think this is because the outward radial placement of the tang 32 isolates the exclusionary corner 66 from distortion of the seal body 5 caused by the reaction of the tang 32 to the torque of the sealing element 4 as the tang 32 prevents rotation of the sealing element 4 with the rotatable shaft 10, which helps to maintain the circularity of the exclusionary corner 66 during relative rotation. We also think the outward radial placement of the tang 32 allows the exclusionary corner 66 to better follow runout related lateral motion of the sealing surface 14, which improves the exclusionary function of the exclusionary corner 66. Whatever the reasons, in our laboratory experiments we found that when a tang is located near the inner peripheral edge of the seal body first end, the exclusionary performance of the exclusionary corner 66 is significantly diminished, resulting in significantly more third body abrasion of the seal.

Second, the outward radial placement of the tang 32 allows space for the shelf 42 to be located radially inward from the restraint 36, to prevent inadvertent loss of the restraint 36, and to position the shelf 42 and a mating portion of the seal body first end 26 at the proper location to allow the shelf 42 to provide axial support to the seal body 5 (via contact with the seal body first end 26) during installation of the sealing element 4 onto the sealing surface 14 of the rotatable shaft 10, and during periods of operation where the pressure of the second fluid 18 is greater than the first fluid 16.

Third, the outward radial placement of the tang 32 places it at a location on the seal body 5 that allows the tang 32 to have more circumferential length, which provides additional strength to the tang 32, making the tang 32 more capable of resisting the torque of the sealing element 4, and less likely to tear lose from the seal body 5.

Fourth, the outward radial placement of the tang 32 provides the tang 32 with an increased mechanical advantage to better resist the torque of the sealing element 4.

Preferably, the sealing element 4 is located radially inward from and encircled by at least a portion of the seal housing 6. Preferably, the sealing element 4 is located radially outward from and encircles at least a portion of the rotatable shaft 10. Preferably, at least a portion of the sealing element 4 is located axially between the at least one restraint 36 and the housing groove wall 30. Preferably, at least a portion of the sealing element 4 is located axially between the outer groove wall 40 and the housing groove wall 30. Preferably, at least a portion of the sealing element 4 is located axially between the inner groove wall 38 and the housing groove wall 30. Preferably, at least a portion of the sealing element 4 is located axially between the shelf 42 and the housing groove wall 30. Preferably, at least a portion of the sealing element 4 is located axially between the first fluid 16 and the second fluid 18 and partitions the first fluid 16 from the second fluid 18.

Preferably, at least a portion of the seal housing 6 is located radially outward from and encircles at least a portion of the sealing element 4. Preferably, at least a portion of the seal housing 6 is located radially outward from and encircles at least a portion of the rotatable shaft 10. The seal housing 6 preferably abuts the shelf member 8 and preferably encircles at least a portion of the pilot surface 46. Preferably, at least a portion of the seal housing 6 is located radially outward from and encircles at least a portion of the shelf 42. Preferably, at least a portion of the seal housing 6 is located radially outward from and encircles at least a portion of the inner groove wall 38 and the outer groove wall 40. Preferably, at least a portion of the seal housing 6 is located radially outward from and encircles at least a portion of the seal body first end 26 and the seal body second end 28.

Preferably, the shelf member 8 is located radially outward from and encircles at least a portion of the rotatable shaft 10. Preferably, a portion of the shelf member 8 is located radially inward from and encircled by the groove bore 12. Preferably, the shelf member 8 is located radially relative to the seal housing 6 by the groove bore 12 of the seal housing 6. Preferably, a portion of the shelf member 8 is located radially inward from the at least one restraint 36. Preferably, a portion of the shelf member 8 is located radially inward from the at least one tang 32. Preferably, a portion of the shelf member 8 is located radially between the at least one restraint 36 and the rotatable shaft 10. Preferably, a portion of the shelf member 8 is located radially between the at least one tang 32 and the rotatable shaft 10.

Preferably, at least a portion of the rotatable shaft 10 is located radially inward from and encircled by the sealing element 4. Preferably, at least a portion of the rotatable shaft 10 is located radially inward from and encircled by the seal housing 6. Preferably, at least a portion of the rotatable shaft 10 is located radially inward from and encircled by the shelf member 8. Preferably, at least a portion of the rotatable shaft 10 is located radially inward from and encircled by the shelf 42. Preferably, at least a portion of the rotatable shaft 10 is located radially inward from and encircled by the outer groove wall 40. Preferably, at least a portion of the rotatable shaft 10 is located radially inward from and encircled by the inner groove wall 38. Preferably, at least a portion of the rotatable shaft 10 is located radially inward from the at least one restraint 36. Preferably, at least a portion of the rotatable shaft 10 is located radially inward from the at least one tang 32.

Preferably, the groove bore 12 is cylindrical. Preferably, the groove bore 12 faces radially inward. Preferably, a portion of the groove bore 12 faces radially inward toward and encircles at least a portion of the sealing element 4. Preferably, a portion of the groove bore 12 faces radially inward toward and encircles at least a portion of each of the at least one tang 32. Preferably, a portion of the groove bore 12 faces radially inward toward and encircles at least a portion of the shelf 42 of the shelf member 8. Preferably, a portion of the groove bore 12 faces radially inward toward and encircles at least a portion of the shelf outer surface 44 of the shelf 42. Preferably, a portion of the groove bore 12 faces radially inward toward and encircles at least a portion of the pilot surface 46 of the shelf member 8. Preferably, a portion of the groove bore 12 faces radially inward toward and encircles at least a portion of the inner groove wall 38. Preferably, a portion of the groove bore 12 faces radially inward toward and encircles at least a portion of the outer groove wall 40. Preferably, a portion of the groove bore 12 faces radially inward toward, abuts, and has a sealed relationship with the static sealing surface 22 of the sealing element 4. Preferably, the groove bore 12 faces radially inward toward and encircles at least a portion of the sealing surface 14 of the rotatable shaft 10.

Preferably, the sealing surface 14 is generally cylindrical, and faces generally radially outward. Preferably, at least a portion of the sealing surface 14 faces radially outward toward and is in sealing engagement with the dynamic sealing surface 20 of the sealing element 4. Preferably, at least a portion of the sealing surface 14 faces radially outward toward and is encircled by at least a portion of the groove bore 12. Preferably, at least a portion of the sealing surface 14 faces radially outward toward and is encircled by at least a portion of the seal housing 6. Preferably, at least a portion of the sealing surface 14 faces radially outward toward and is encircled by at least a portion of the shelf 42 of the shelf member 8. Preferably, at least a portion of the sealing surface 14 faces radially outward toward the at least one restraint 36. Preferably, at least a portion of the sealing surface 14 faces radially outward toward the at least one tang 32. Preferably, at least a portion of the sealing surface 14 is located radially inward from the at least one restraint 36. Preferably, at least a portion of the sealing surface 14 is located radially inward from the at least one tang 32.

Preferably, at least part of the first fluid 16 is located radially outward from and is in contact with a portion of the sealing surface 14 of the rotatable shaft 10. Preferably, the first fluid 16 contacts the sealing element 4, the seal housing 6, the shelf member 8, the rotatable shaft 10, the groove bore 12, the sealing surface 14, the static seal 24, the seal body first end 26, every tang 32, every restraint 36, the inner groove wall 38, the outer groove wall 40, the shelf 42, the shelf outer surface 44, the pilot surface 46, and the shelf bore 47.

Preferably, at least part of the second fluid 18 is located radially outward from and is in contact with a portion of the sealing surface 14 of the rotatable shaft 10. Preferably, the second fluid 18 contacts a portion of the sealing element 4, the seal housing 6, the rotatable shaft 10, and the sealing surface 14.

Preferably, the dynamic sealing surface 20 of the sealing element 4 faces generally radially inward toward and adjoins the sealing surface 14 of the rotatable shaft 10. Preferably, the dynamic sealing surface 20 has an axial width that varies around the circumference of the sealing element 4, for the promotion of hydrodynamic film lubrication of the dynamic sealing interface between the dynamic sealing surface 20 and the sealing surface 14 during periods when the rotatable shaft 10 has relative rotation with respect to the sealing element 4. Preferably, the dynamic sealing surface 20 faces generally away from and in generally the same direction as the groove bore 12. Preferably, the dynamic sealing surface 20 and the static sealing surface 22 face in generally opposite radial directions, away from one another.

Preferably, the dynamic sealing surface 20 is situated in axially intermediate location to the seal body first end 26 and the seal body second end 28. Preferably, the dynamic sealing surface 20 is situated in axially intermediate location to the at least one tang 32 and the seal body second end 28. Preferably, the dynamic sealing surface 20 is situated in axially intermediate location to the at least one restraint 36 and the seal body second end 28.

Preferably, the static sealing surface 22 of the sealing element 4 faces in a generally radially outward direction, away from the sealing surface 14 of the rotatable shaft 10 and toward and abutting the groove bore 12 of the seal housing 6. Preferably, the static sealing surface 22 is situated in axially intermediate location to the seal body first end 26 and the seal body second end 28. Preferably, the static sealing surface 22 is situated in axially intermediate location to the at least one tang 32 and the seal body second end 28. Preferably, the static sealing surface 22 is situated in axially intermediate location to the at least one restraint 36 and the seal body second end 28. Preferably, the static sealing surface 22 is located radially outward from and encircles at least a portion of the dynamic sealing surface 20.

Preferably, the static seal 24 is a face-sealing element such as the O-ring that is illustrated, and establishes sealing with and between the seal housing 6 and the shelf member 8. Preferably, the static seal 24 is located radially outward from and encircles a portion of the groove bore 12. Preferably, the static seal 24 is located radially outward from and encircles a portion of the pilot surface 46. Preferably, the static seal 24 is located radially outward from and encircles a portion of the shelf member 8. Preferably, the static seal 24 is located radially outward from and encircles a portion of the rotatable shaft 10.

Preferably, the seal body first end 26 faces in a generally axial direction toward the at least one restraint 36, inner groove wall 38, outer groove wall 40, shelf 42, shelf outer surface 44 and shelf bore 47. Preferably, the seal body first end 26 faces in a generally axial direction away from the housing groove wall 30 and the seal body second end 28. Preferably, the seal body first end 26 and the seal body second end 28 face in generally opposite directions, away from each other. Preferably, the seal body first end 26 faces in the same generally axial direction that the housing groove wall 30 faces. Preferably, seal body first end 26 is located radially inward from and is encircled by the groove bore 12 of the seal housing 6.

Preferably, the seal body second end 28 faces in a generally axial direction toward the housing groove wall 30 and away from the seal body first end 26, the at least one tang 32, the at least one restraint 36, inner groove wall 38, outer groove wall 40, shelf 42, shelf outer surface 44, and shelf bore 47.

Preferably, the seal body second end 28 is situated in axially intermediate location to the housing groove wall 30 and the seal body first end 26. Preferably, the seal body second end 28 is situated in axially intermediate location to the housing groove wall 30 and the at least one tang 32. Preferably, the seal body second end 28 is situated in axially intermediate location to the housing groove wall 30 and the at least one restraint 36. Preferably, the seal body second end 28 is situated in axially intermediate location to the housing groove wall 30 and the inner groove wall 38. Preferably, the seal body second end 28 is situated in axially intermediate location to the housing groove wall 30 and the outer groove wall 40. Preferably, the seal body second end 28 is situated in axially intermediate location to the housing groove wall 30 and the shelf 42. Preferably, the seal body second end 28 is situated in axially intermediate location to the housing groove wall 30 and the shelf outer surface 44. Preferably, the seal body second end 28 is situated in axially intermediate location to the housing groove wall 30 and the pilot surface 46. Preferably, the seal body second end 28 is situated in axially intermediate location to the housing groove wall 30 and the shelf bore 47. Preferably, the seal body second end 28 is located radially inward from the groove bore 12. Preferably, the seal body second end 28 is located radially inward from and is encircled by a portion of the seal housing 6.

Preferably, the housing groove wall 30 faces in a generally axial direction toward the seal body first end 26, seal body second end 28, the at least one tang 32, the at least one restraint 36, inner groove wall 38, outer groove wall 40, shelf 42, shelf outer surface 44, pilot surface 46, and shelf bore 47. Preferably, the housing groove wall 30 and the inner groove wall 38 face in generally opposite directions, toward one another. Preferably, the housing groove wall 30 and the outer groove wall 40 face in generally opposite directions, toward one another. Preferably, the inner groove wall 38 and the outer groove wall 40 face in the same general axial direction. Preferably, the outer groove wall 40 is more distant than the inner groove wall 38 from the seal body first end 26 and from the housing groove wall 30.

Preferably, each tang 32 is situated in axially intermediate location to the outer groove wall 40 and the seal body first end 26. Preferably, each tang 32 is situated in axially intermediate location to the outer groove wall 40 and the seal body second end 28. Preferably, each tang 32 is situated in axially intermediate location to the outer groove wall 40 and the housing groove wall 30. Preferably, each tang 32 is located directly between the outer groove wall 40 and the seal body 5.

Preferably, when there is more than one tang 32, they are circumferentially spaced from one another. Preferably, each tang 32 is located radially inward from and encircled by the groove bore 12. Preferably, each tang 32 is located radially outward from the shelf 42. Preferably, each tang 32 is located radially outward from the shelf outer surface 44. Preferably, each tang 32 is located radially outward from the sealing surface 14. Preferably, each tang 32 is situated in radially intermediate location to at least a portion of the rotatable shaft 10 and the groove bore 12. Preferably, each tang 32 is situated in radially intermediate location to the sealing surface 14 and the groove bore 12. Preferably, each tang 32 is situated in radially intermediate location to the inner groove wall 38 and the groove bore 12. Preferably, each tang 32 is situated in radially intermediate location to the shelf 42 and the groove bore 12. Preferably, each tang 32 is situated in radially intermediate location to the shelf outer surface 44 and the groove bore 12. Preferably, each tang 32 is situated in radially intermediate location to the shelf bore 47 and the groove bore 12. Preferably, each tang 32 is situated in radially intermediate location to the corner break 53 and the groove bore 12. Preferably, each tang 32 is situated in radially intermediate location to the dynamic sealing surface 20 and the static sealing surface 22.

Preferably, each mounting hole 34 is located radially outward from the shelf outer surface 44. Preferably, each mounting hole 34 is located radially outward from the shelf 42. Preferably, each mounting hole 34 is located radially outward from the sealing surface 14. Preferably, when more than one mounting hole 34 is used, they are circumferentially spaced from one another.

Preferably, each restraint 36 is located by and is located partially within its mating mounting hole 34. Preferably, each restraint 36 is situated in axially intermediate location to the outer groove wall 40 and the seal body first end 26. Preferably, each restraint 36 is situated in axially intermediate location to the outer groove wall 40 and the seal body second end 28. Preferably, each restraint 36 is situated in axially intermediate location to the outer groove wall 40 and the housing groove wall 30. Preferably, each restraint 36 is located radially outward of the shelf 42. Preferably, each restraint 36 is located radially outward of the shelf outer surface 44. Preferably, each restraint 36 is located radially outward of the sealing surface 14. Preferably, each restraint 36 is located radially outward of the rotatable shaft 10. Preferably, each restraint 36 has an axis, and the axis is oriented radially. Preferably, each restraint 36 has a portion thereof that is located within its mating mounting hole 34 and located radially outward of the groove bore 12. Preferably, when there is more than one restraint 36, each restraint 36 is circumferentially spaced from the others.

Preferably, the inner groove wall 38 faces in a generally axial direction toward the seal body first end 26, seal body second end 28, and the housing groove wall 30. Preferably, the inner groove wall 38 and the seal body second end 28 face in the same general axial direction. Preferably, the inner groove wall 38 and the housing groove wall 30 face in generally opposite directions and toward each other. Preferably, the inner groove wall 38 and the seal body first end 26 face in generally opposite directions and toward each other. Preferably, the inner groove wall 38 is located radially between the at least one tang 32 and the sealing surface 14 of the rotatable shaft 10. Preferably, the inner groove wall 38 is located radially between the at least one tang 32 and the sealing surface 14 of the rotatable shaft 10. Preferably, the inner groove wall 38 is located radially inward from and encircled by the groove bore 12. Preferably, the inner groove wall 38 is situated in radially intermediate location to the groove bore 12 and the sealing surface 14. Preferably, the inner groove wall 38 is situated in radially intermediate location to the at least one tang 32 and the sealing surface 14. Preferably, the inner groove wall 38 is situated in radially intermediate location to every restraint 36 and the sealing surface 14. Preferably, the inner groove wall 38 is situated in radially intermediate location to the shelf outer surface 44 and the sealing surface 14. Preferably, the inner groove wall 38 is situated in axially intermediate location to the outer groove wall 40 and the seal body first end 26. Preferably, the inner groove wall 38 is situated in axially intermediate location to the outer groove wall 40 and the seal body second end 28. Preferably, the inner groove wall 38 is situated in axially intermediate location to the outer groove wall 40 and the housing groove wall 30. Preferably, the inner groove wall 38 is an end surface of the shelf 42.

Preferably, the groove bore 12 and the housing groove wall 30 intersect at a gland corner 82 that is an internal corner, and generally circular. Preferably, the sealing element 4, seal housing 6, shelf member 8, and static seal 24 are annular components. Preferably, the groove bore 12, sealing surface 14, dynamic sealing surface 20, static sealing surface 22, seal body first end 26, seal body second end 28, housing groove wall 30, inner groove wall 38, outer groove wall 40, shelf 42, shelf outer surface 44, pilot surface 46, shelf bore 47, corner break 53, exclusionary corner 66, dynamic sealing lip 68, and gland corner 82 are annular features.

Preferably, the outer groove wall 40 faces in a generally axial direction toward the at least one tang 32, the at least one restraint 36, seal body first end 26, seal body second end 28, housing groove wall 30, and axial tang end 54. Preferably, the outer groove wall 40 and the seal body second end 28 face in the same generally axial direction. Preferably, the outer groove wall 40 and the seal body first end 26 face in generally opposite directions and toward each other. Preferably, the outer groove wall 40 and the housing groove wall 30 face in generally opposite directions and toward each other. Preferably, the outer groove wall 40 is situated in radially intermediate location to the groove bore 12 and the shelf outer surface 44. Preferably, the outer groove wall 40 is situated in radially intermediate location to the groove bore 12 and the shelf 42. Preferably, the outer groove wall 40 is situated in radially intermediate location to the groove bore 12 and the rotatable shaft 10. Preferably, the outer groove wall 40 is situated in radially intermediate location to the groove bore 12 and the sealing surface 14. Preferably, the outer groove wall 40 is located radially outward of and encircles the rotatable shaft 10. Preferably, the outer groove wall 40 is located radially outward of and encircles the sealing surface 14. Preferably, the outer groove wall 40 is located radially inward of and is encircled by the groove bore 12.

Preferably, the shelf 42 is located radially outward of and encircles a portion of the rotatable shaft 10. Preferably, the shelf 42 is located radially outward of and encircles a portion of the sealing surface 14. Preferably, the shelf 42 is located radially inward of the at least one tang 32. Preferably, the shelf 42 is located radially inward of every restraint 36. Preferably, the shelf 42 is located radially inward of every mounting hole 34. Preferably, the shelf 42 is located radially inward of and is encircled by the groove bore 12. Preferably, the shelf 42 is situated in axially intermediate location to the outer groove wall 40 and the seal body first end 26. Preferably, the shelf 42 is situated in axially intermediate location to the outer groove wall 40 and the seal body second end 28. Preferably, the shelf 42 is situated in axially intermediate location to the outer groove wall 40 and the housing groove wall 30. Preferably, the shelf 42 is located radially between the groove bore 12 and the sealing surface 14. Preferably, the shelf 42 is located radially between the groove bore 12 and the rotatable shaft 10. Preferably, the shelf 42 is located radially between every restraint 36 and the sealing surface 14. Preferably, the shelf 42 is located radially between every restraint 36 and the rotatable shaft 10. Preferably, the shelf 42 is located radially between every mounting hole 34 and the sealing surface 14. Preferably, the shelf 42 is located radially between every mounting hole 34 and the rotatable shaft 10. Preferably, the shelf 42 is located radially between every tang 32 and the rotatable shaft 10.

Preferably, the shelf outer surface 44 is located radially outward of and encircles the rotatable shaft 10. Preferably, the shelf outer surface 44 is located radially outward of and encircles the sealing surface 14. Preferably, the shelf outer surface 44 is located radially outward of and encircles the shelf bore 47. Preferably, the shelf outer surface 44 is located radially inward of the at least one tang 32. Preferably, the shelf outer surface 44 is located radially inward of every restraint 36. Preferably, the shelf outer surface 44 is located radially inward of every mounting hole 34. Preferably, the shelf outer surface 44 is located radially inward of and is encircled by the groove bore 12. Preferably, the shelf outer surface 44 is situated in axially intermediate location to the outer groove wall 40 and the seal body first end 26. Preferably, the shelf outer surface 44 is situated in axially intermediate location to the outer groove wall 40 and the seal body second end 28. Preferably, the shelf outer surface 44 is situated in axially intermediate location to the outer groove wall 40 and the housing groove wall 30. Preferably, the shelf outer surface 44 is situated in axially intermediate location to the outer groove wall 40 and the corner break 53. Preferably, the shelf outer surface 44 faces generally radially outward toward the inner peripheral surface 50 of the at least one tang 32 and faces generally toward the at least one restraint 36 and blocks (i.e., physically prevents) disengagement of the at least one restraint 36 from the at least one mounting hole 34.

Preferably, the corner break 53 is situated in axially intermediate location to the outer groove wall 40 and the inner groove wall 38. Preferably, the corner break 53 is situated in axially intermediate location to the outer groove wall 40 and the seal body first end 26. Preferably, the corner break 53 is situated in axially intermediate location to the outer groove wall 40 and the seal body second end 28. Preferably, the corner break 53 is situated in axially intermediate location to the outer groove wall 40 and the housing groove wall 30. Preferably, the corner break 53 is situated in axially intermediate location to the shelf outer surface 44 and the inner groove wall 38. Preferably, the corner break 53 is situated in axially intermediate location to the shelf outer surface 44 and the seal body first end 26. Preferably, the corner break 53 is situated in axially intermediate location to the shelf outer surface 44 and the seal body second end 28. Preferably, the corner break 53 is situated in axially intermediate location to the shelf outer surface 44 and the housing groove wall 30.

Preferably, the corner break 53 is situated in radially intermediate location to every mounting hole 34 and the inner groove wall 38. Preferably, the corner break 53 is situated in radially intermediate location to and between every mounting hole 34 and the shelf bore 47. Preferably, the corner break 53 is situated in radially intermediate location to and between every mounting hole 34 and the sealing surface 14.

Preferably, the corner break 53 is situated in radially intermediate location to the groove bore 12 and the inner groove wall 38. Preferably, the corner break 53 is situated in radially intermediate location to and between the groove bore 12 and the shelf bore 47. Preferably, the corner break 53 is situated in radially intermediate location to and between the groove bore 12 and the sealing surface 14. Preferably, the corner break 53 is situated in radially intermediate location to the outer groove wall 40 and the inner groove wall 38. Preferably, the corner break 53 is situated in radially intermediate location to the outer groove wall 40 and the shelf bore 47. Preferably, the corner break 53 is situated in radially intermediate location to the outer groove wall 40 and the sealing surface 14. Preferably, the corner break 53 is situated in radially intermediate location to, adjacent to, and abutting the shelf outer surface 44 and the inner groove wall 38. Preferably, the corner break 53 is situated in radially intermediate location to the shelf outer surface 44 and the shelf bore 47. Preferably, the corner break 53 is situated in radially intermediate location to the shelf outer surface 44 and the sealing surface 14.

Preferably, the pilot surface 46 is a cylindrical surface that faces radially outward toward and adjoins a portion of the groove bore 12. Preferably, the pilot surface 46 is situated in radially intermediate location to the groove bore 12 and the outer groove wall 40. Preferably, the pilot surface 46 is situated in radially intermediate location to the groove bore 12 and the shelf outer surface 44. Preferably, the pilot surface 46 is situated in radially intermediate location to the groove bore 12 and the shelf 42. Preferably, the pilot surface 46 is situated in radially intermediate location to the groove bore 12 and the rotatable shaft 10. Preferably, the pilot surface 46 is situated in radially intermediate location to the groove bore 12 and the sealing surface 14. Preferably, the pilot surface 46 is located radially outward from and encircles a portion of the rotatable shaft 10. Preferably, the pilot surface 46 is located radially outward from and encircles a portion of the sealing surface 14. Preferably, the pilot surface 46 is located radially between the groove bore 12 and the shelf bore 47. Preferably, the pilot surface 46 is located radially between the groove bore 12 and the sealing surface 14. Preferably, the pilot surface 46 faces radially outward toward and is encircled by and adjoins the seal housing 6 and locates the seal housing 6 and the shelf member 8 radially with respect to one another. Preferably, the groove bore 12 faces toward, encircles, and adjoins the pilot surface 46.

Preferably, the sealing surface 14 is generally cylindrical in form and faces generally radially outward toward the sealing element 4, seal body 5, seal housing 6, shelf member 8, groove bore 12, first fluid 16, second fluid 18, dynamic sealing surface 20, static sealing surface 22, static seal 24, seal body first end 26, seal body second end 28, housing groove wall 30, the at least one tang 32, every mounting hole 34, every restraint 36, inner groove wall 38, outer groove wall 40, shelf 42, shelf outer surface 44, pilot surface 46, shelf bore 47, outer peripheral surface 48, inner peripheral surface 50, tang fillet 52, corner break 53, axial tang end 54, first circumferential end 58, exclusionary corner 66, inner body surface 70, angled flank 72, inlet curvature 74, wavy intersection 76, and gland corner 82.

In applications where the pressure of the first fluid 16 is at least at atmospheric pressure and the second fluid 18 is located in a closed chamber 83, one way to ensure that the pressure of the second fluid 18 is always less than the pressure of the first fluid 16 is to not completely fill the chamber 83 with the second fluid 18, and then pull a vacuum on the chamber 83 to create a vacuum in the chamber 83. This ensures that the pressure of the first fluid 16 is at least about one atmosphere greater than the pressure of the second fluid 18. The reason for not completely filling the chamber 83 is to provide room for thermal expansion of the second fluid 18. It is to be understood that the chamber 83 can be attached to the seal housing 6 by any suitable means. A valve 85 will typically be required to provide access to the chamber 83 and to be able to disconnect and remove the vacuum pump 87 that is used to pull the vacuum in the chamber 83. The valve 85 is located between the vacuum pump 87 and the chamber 83. In addition to working with the seal assemblies shown in FIGS. 1 and 5, it is to be understood that this technique can also be used with the seal assemblies of FIGS. 7 and 12, although the closed chamber 83, valve 85, and vacuum pump 87 are not shown in those figures. The technique also works with FIGS. 9, 10, and 11 described below, if the lubricant reservoir 98 is eliminated.

Differences Between FIGS. 1 and 5

There are two principal differences between FIGS. 1 and 5. Firstly, in FIG. 1 the angled flank 72 and the inlet curvature 74 face toward and are exposed to the first fluid 16, and in FIG. 5 the angled flank 72 and the inlet curvature 74 face toward and are exposed to the second fluid 18. As a result, in FIG. 1 the inlet curvature 74 is situated in intermediate relation to the dynamic sealing surface 20 and the seal body first end 26 at any axial cross-section of the sealing element 4, and in FIG. 5 the inlet curvature 74 is situated in intermediate relation to the dynamic sealing surface 20 and the seal body second end 28 at any axial cross-section of the sealing element 4. In FIG. 1, the inlet curvature 74 is closer than the dynamic sealing surface 20 to the seal body first end 26 and to the shelf 42, whereas in FIG. 5 the inlet curvature 74 is more distant than the dynamic sealing surface 20 from the seal body first end 26 and from the shelf 42. In FIG. 1, the first fluid 16 that contacts the inlet curvature 74 is preferably a lubricant and in FIG. 5, the second fluid 18 that contacts the inlet curvature 74 is preferably a lubricant.

Secondly, in FIG. 1 the exclusionary corner 66 is illustrated as an intersection between the dynamic sealing surface 20 and the seal body second end 28 (as taught by U.S. Pat. No. 4,610,319), and in FIG. 5 the exclusionary corner 66 is illustrated as an intersection between the dynamic sealing surface 20 and an angled transitional geometry 84 (as taught by U.S. Pat. No. 6,120,036). The angled transitional geometry 84 is located between and adjacent to the seal body first end 26 and the dynamic sealing surface 20, and the angled transitional geometry 84 is closer than the dynamic sealing surface 20 to the shelf 42.

Figure 2:
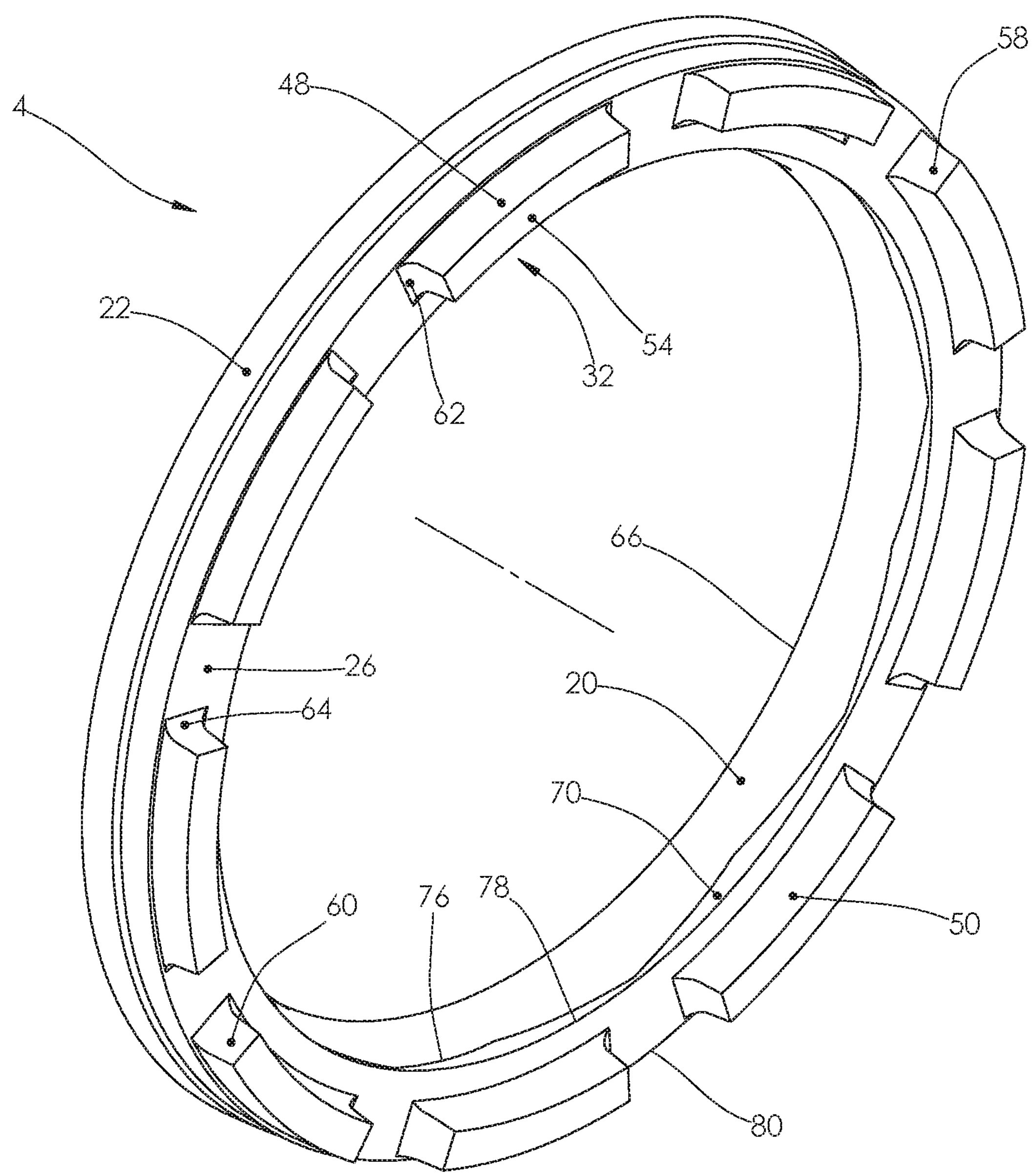
FIG. 2 is a perspective view of a sealing element that is illustrated in FIG. 1.

Description of FIG. 2

FIG. 2 is a perspective view of the sealing element 4 that is illustrated in FIG. 1. The dynamic sealing surface 20, static sealing surface 22, seal body first end 26, tang 32, outer peripheral surface 48, inner peripheral surface 50, axial tang end 54, exclusionary corner 66, inner body surface 70, wavy intersection 76, inner peripheral edge 78, and outer peripheral edge 80 are identified for orientation purposes. FIG. 2 is included primarily to illustrate that the at least one tang 32 can be a plurality of tangs 32 arranged in a circular pattern.

Preferably each tang 32 has a first circumferential end 58 and a second circumferential end 60 that face in generally opposite, generally circumferential directions. In other words, preferably, the second circumferential end 60 of a given tang 32 faces in a generally circumferential direction away from the first circumferential end 58 of that tang 32. Preferably a first end fillet 62 blends the first circumferential end 58 to the seal body first end 26, to help to reduce shear stress at the base of the tang 32 (i.e., at the interface between the tang 32 and the seal body 5) and to help to minimize seal-torque induced stress concentration at the juncture between the first circumferential end 58 and the seal body first end 26, which helps to prevent the tang 32 from tearing loose from the remainder of the sealing element 4. Preferably a second end fillet 64 blends the second circumferential end 60 to the seal body first end 26, to reduce shear stress at the base of the tang 32 (i.e., at the interface between the tang 32 and the seal body 5) and to help to minimize seal-torque induced stress concentration at the juncture between the second circumferential end 60 and the seal body first end 26, which helps to prevent the tang 32 from tearing loose from the remainder of the sealing element 4. Preferably, the first end fillet 62 is located between and adjacent to the first circumferential end 58 and the seal body first end 26 and provides a smooth blended transition between the first circumferential end 58 and the seal body first end 26. Preferably, the second end fillet 64 is located between and adjacent to the second circumferential end 60 and the seal body first end 26 and provides a smooth blended transition between the second circumferential end 60 and the seal body first end 26.

When there is more than one tang 32, the first circumferential end 58 of each tang 32 is circumferentially spaced from and preferably faces in a generally circumferential direction toward the second circumferential end 60 of another tang 32. The circumferential space provides room for the restraints 36, when the seal 4 is installed.

Figure 3:
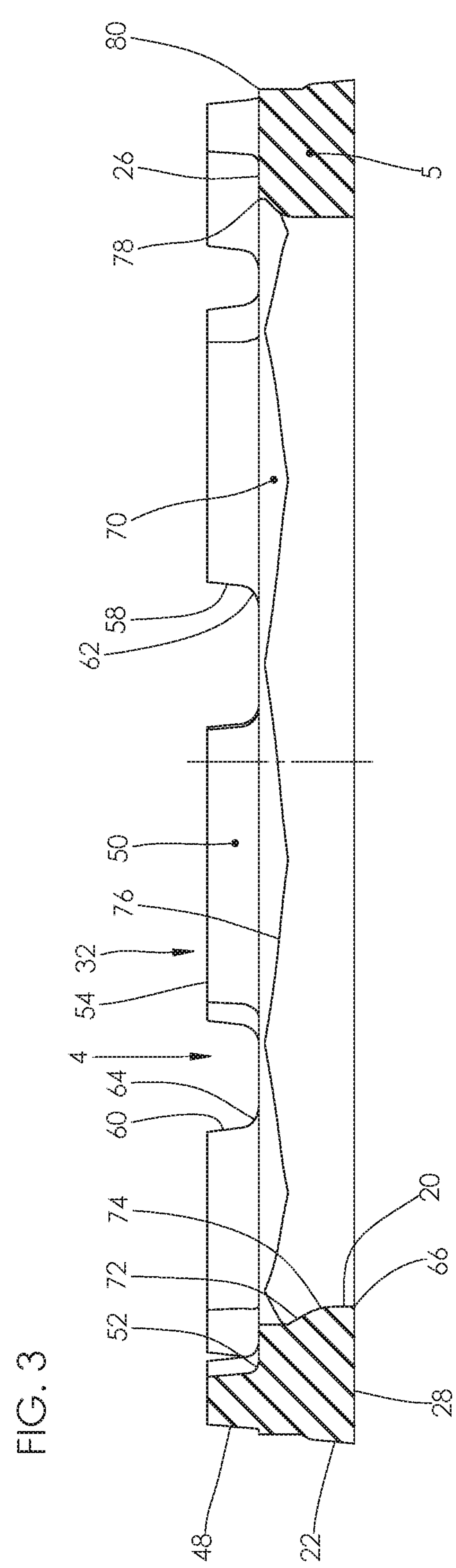
FIG. 3 is a cross-sectional view of the sealing element shown in FIG. 2.

Description of FIG. 3

FIG. 3 is a cross-sectional view of the sealing element 4 that is illustrated in FIGS. 1 and 2. The seal body 5, dynamic sealing surface 20, static sealing surface 22, seal body first end 26, seal body second end 28, tang 32, outer peripheral surface 48, inner peripheral surface 50, tang fillet 52, axial tang end 54, first circumferential end 58, second circumferential end 60, first end fillet 62, second end fillet 64, exclusionary corner 66, inner body surface 70, angled flank 72, inlet curvature 74, wavy intersection 76, inner peripheral edge 78, and outer peripheral edge 80 are identified for orientation purposes.

If desired, the exclusionary corner 66 may be formed by an intersection between the dynamic sealing surface 20 and the seal body second end 28, as illustrated. If desired, the inner body surface 70, angled flank 72, inlet curvature 74, and wavy intersection 76 may be annular features. Preferably, the seal body first end 26 has an inner peripheral edge 78 of annular form and an outer peripheral edge 80 of annular form. Preferably, the at least one tang 32 is situated in intermediate radial relation to and between the inner peripheral edge 78 and the outer peripheral edge 80. Preferably, the at least one tang 32 is located closer (i.e., nearer) to the outer peripheral edge 80 than it is to the inner peripheral edge 78. Another way of saying this is that preferably, the outer peripheral edge 80 is nearer than the inner peripheral edge 78 to the at least one tang 32.

Preferably, the outer peripheral edge 80 is annular and is located radially outward from and encircles the inner peripheral edge 78. Preferably, the inner peripheral edge 78 is annular and is located radially inward from and encircled by the outer peripheral edge 80. Preferably, the at least one tang 32 is situated in intermediate radial relation to the dynamic sealing surface 20 and the static sealing surface 22. Preferably, the static sealing surface 22 is a surface of a radially projecting static lip of the type taught by commonly assigned U.S. Pat. No. 5,230,520, as illustrated.

When there is more than one tang 32, the first circumferential end 58 of each tang 32 is circumferentially spaced from and preferably faces in a generally circumferential direction toward the second circumferential end 60 of another tang 32. The circumferential space provides room for the restraints 36, when the seal 4 is installed.

Figure 4:
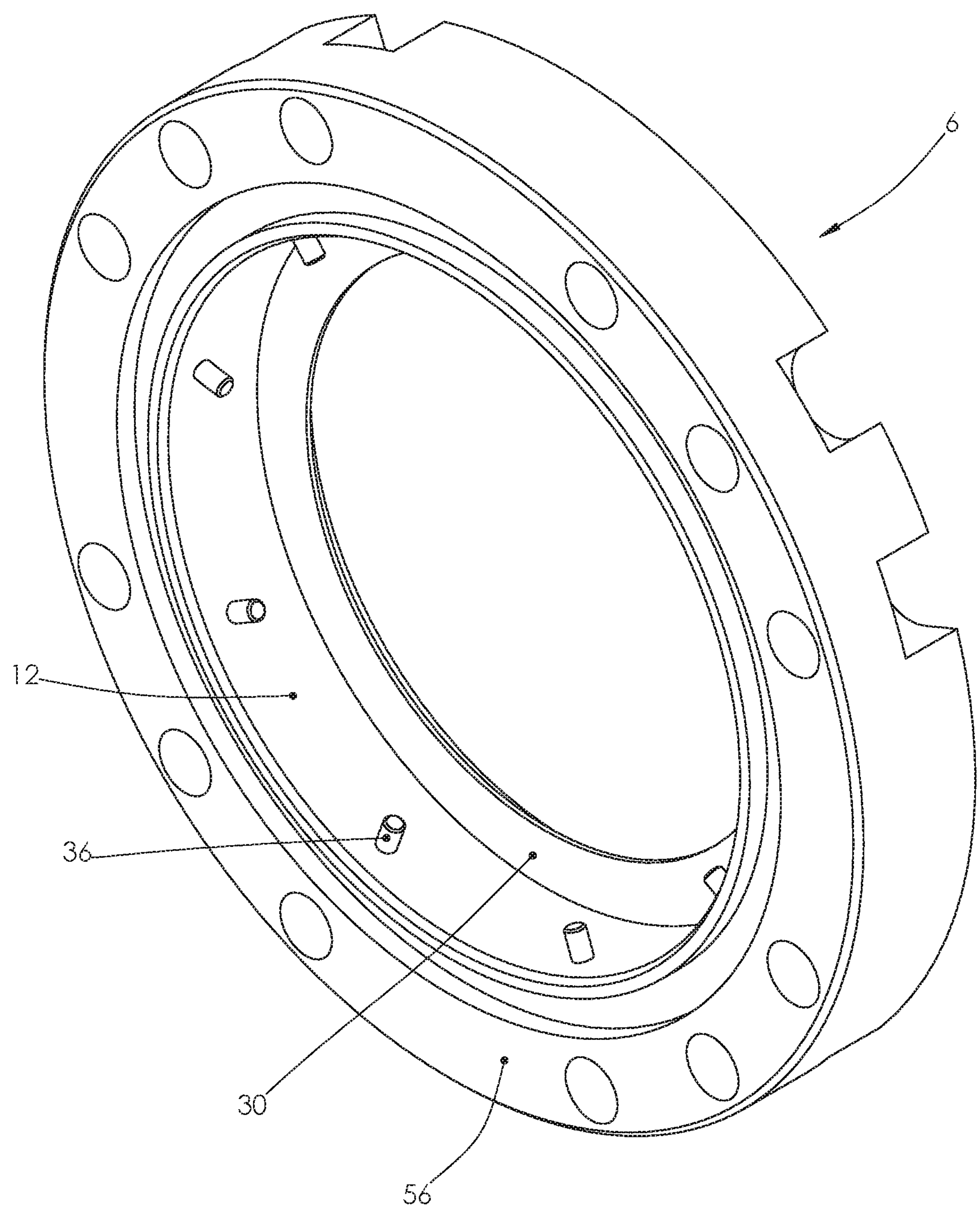
FIG. 4 is a perspective view of a seal housing of the rotary shaft sealing assembly of FIG. 1 and a plurality of restraints.

Description of FIG. 4

FIG. 4 is a perspective view of an assembly of the seal housing 6 and the at least one restraint 36 that are illustrated in FIGS. 1 and 5. The groove bore 12, housing groove wall 30, restraint 36, and housing indexing surface 56 are identified for orientation purposes. FIG. 4 is included to illustrate that the at least one restraint 36 can be a plurality of restraints 36 arranged in a circular pattern.

Figure 6:
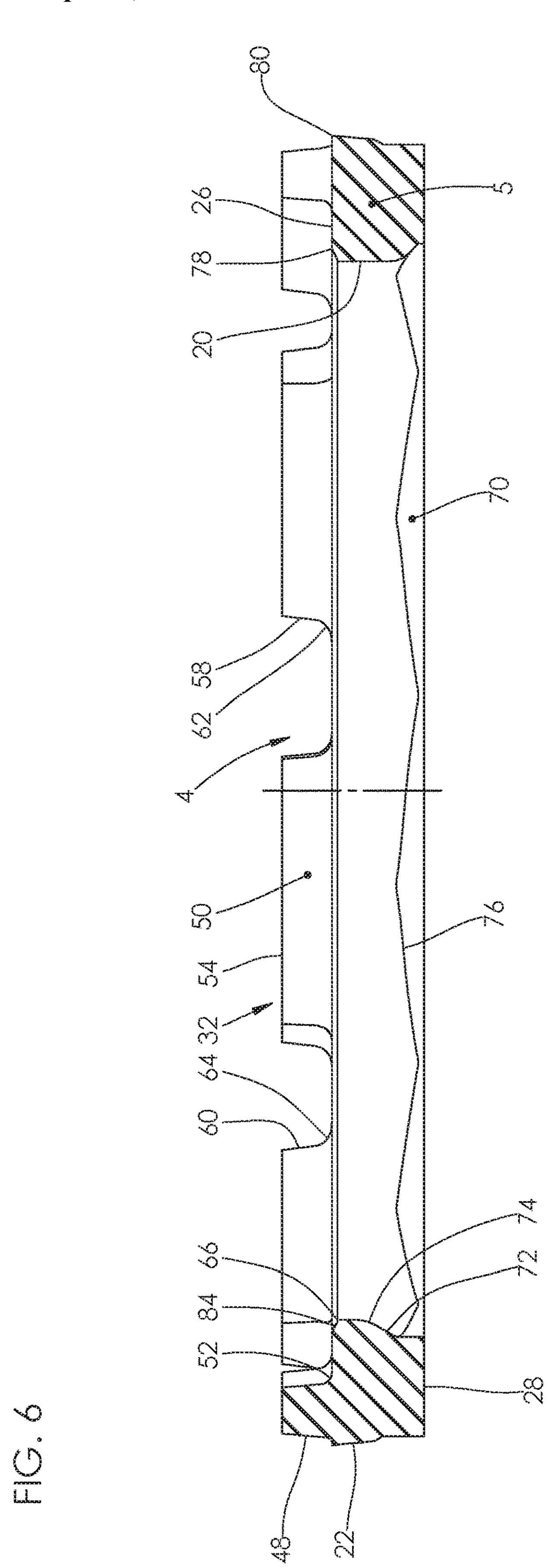
FIG. 6 is a cross-sectional view of a sealing element that is illustrated in FIG. 5.

Description of FIG. 6

FIG. 6 is a cross-sectional view of the sealing element 4 that is illustrated in FIGS. 5, 7, 8, 9, 10, 11 and 12. The seal body 5, dynamic sealing surface 20, static sealing surface 22, seal body first end 26, seal body second end 28, tang 32, outer peripheral surface 48, inner peripheral surface 50, tang fillet 52, axial tang end 54, first circumferential end 58, second circumferential end 60, first end fillet 62, second end fillet 64, exclusionary corner 66, inner body surface 70, angled flank 72, inlet curvature 74, wavy intersection 76, inner peripheral edge 78, and outer peripheral edge 80 are identified for orientation purposes.

If desired, the exclusionary corner 66 may be formed by an intersection between the dynamic sealing surface 20 and an angled transitional geometry 84, as illustrated. If desired, the inner body surface 70, angled flank 72, inlet curvature 74, and wavy intersection 76 may be annular features. Preferably, the seal body first end 26 has an inner peripheral edge 78 of annular form and an outer peripheral edge 80 of annular form. Preferably, the at least one tang 32 is situated in intermediate radial relation to and between the inner peripheral edge 78 and the outer peripheral edge 80. Preferably, the at least one tang 32 is located closer (i.e., nearer) to the outer peripheral edge 80 than it is to the inner peripheral edge 78. Another way of saying this is that preferably, the outer peripheral edge 80 is nearer than the inner peripheral edge 78 to the at least one tang 32. This radial location of the at least one tang 32 is preferred in order to allow room for the shelf 42 that is illustrated in FIGS. 1 and 5. Preferably, the outer peripheral edge 80 is annular and is located radially outward from and encircles the inner peripheral edge 78. Preferably, the inner peripheral edge 78 is annular and is located radially inward from and encircled by the outer peripheral edge 80. Preferably, the at least one tang 32 is situated in intermediate radial relation to the dynamic sealing surface 20 and the static sealing surface 22. Preferably, the static sealing surface 22 is a surface of a radially projecting static lip of the type taught by commonly assigned U.S. Pat. No. 5,230,520, as illustrated.

When there is more than one tang 32, the first circumferential end 58 of each tang 32 is circumferentially spaced from and preferably faces in a generally circumferential direction toward the second circumferential end 60 of another tang 32. The circumferential space provides room for the restraints 36, when the seal 4 is installed.

The dynamic sealing surface 20 is situated in axially intermediate relation to the at least one tang 32 and the inlet curvature 74 at any axial cross-section of the sealing element 4. The dynamic sealing surface 20 is nearer than the inlet curvature 74 to the at least one tang 32, and the inlet curvature 74 is more distant than the dynamic sealing surface 20 from the at least one tang 32.

Figure 7:
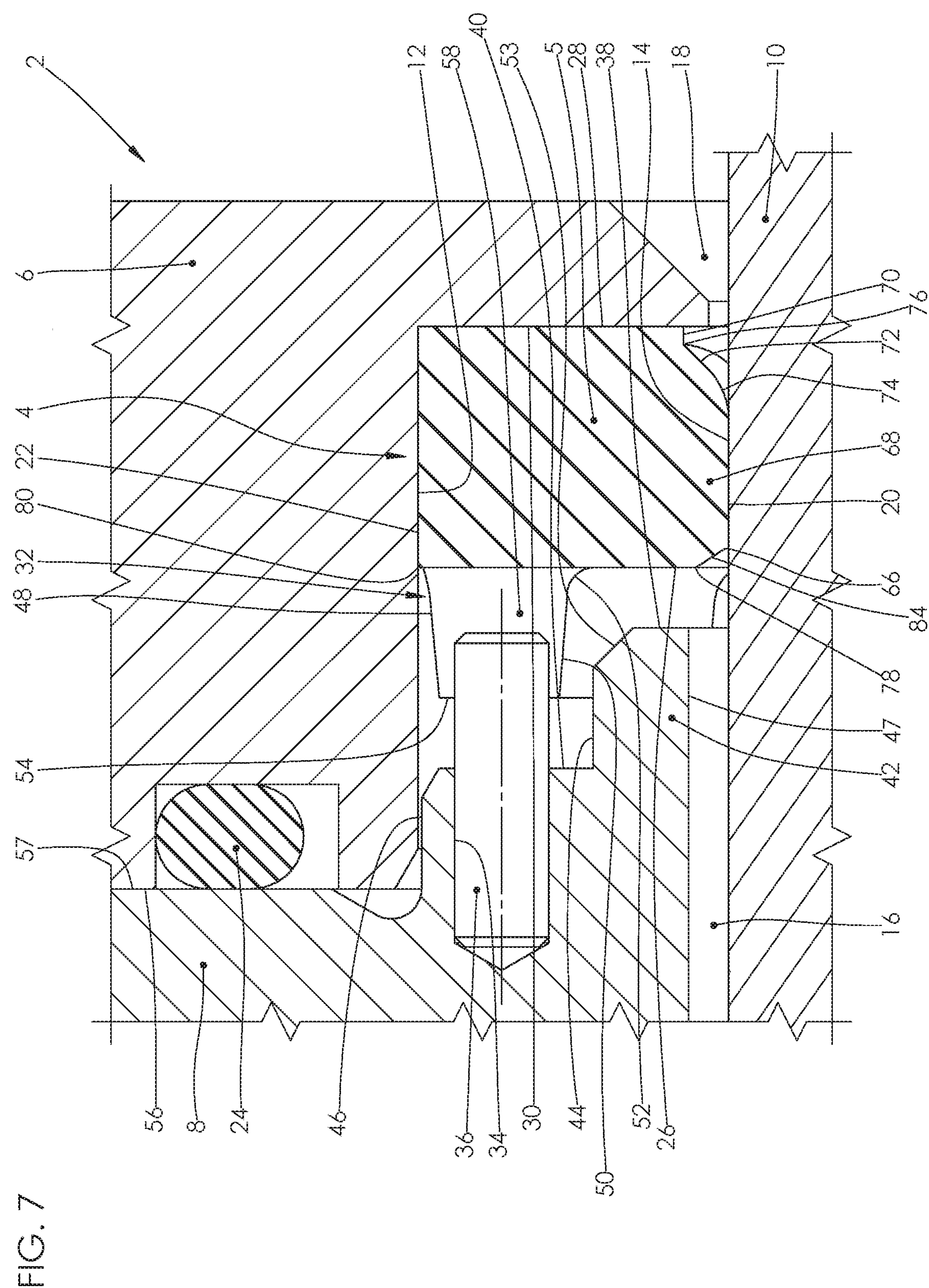
FIG. 7 is a fragmentary cross-sectional view of a rotary shaft sealing assembly according to a third preferred embodiment of the present invention.

Description of FIG. 7

FIG. 7 is a fragmentary cross-sectional view of a preferred rotary shaft sealing assembly that is shown generally at 2. The arrangement shown in FIG. 7 is much like the arrangement shown in FIG. 5, except the at least one mounting hole 34 is formed in the shelf member 8, which means that the restraint 36 is secured in position by the shelf member 8. As with FIGS. 1 and 5, the shelf 42 is interposed between the at least one restraint 36 and the rotatable shaft 10 and blocks the restraint 36 from contacting the rotatable shaft 10 if the restraint 36 inadvertently becomes loose. As with FIGS. 1 and 5, the restraint 36 is radially and circumferentially aligned with the at least one tang 32, which prevents the sealing element 4 from rotating with the rotatable shaft 10. For orientation purposes, the following items are also labeled in FIG. 7: seal body 5, seal housing 6, groove bore 12, sealing surface 14, first fluid 16, second fluid 18, dynamic sealing surface 20, static sealing surface 22, static seal 24, seal body first end 26, seal body second end 28, housing groove wall 30, inner groove wall 38, outer groove wall 40, shelf outer surface 44, pilot surface 46, shelf bore 47, outer peripheral surface 48, inner peripheral surface 50, tang fillet 52, corner break 53, axial tang end 54, housing indexing surface 56, shelf member indexing surface 57, first circumferential end 58, exclusionary corner 66, dynamic sealing lip 68, inner body surface 70, angled flank 72, inlet curvature 74, wavy intersection 76, inner peripheral edge 78, outer peripheral edge 80, and angled transitional geometry 84.

The use of lubricant over-pressure to improve the life of rotary seals has long been the conventional wisdom. This conventional wisdom can be traced to the amplifying differential area piston arrangement for lubricating a packing stuffing box gland that is shown in FIG. 177 of T. C. Thomsen's 1920 book "The Practice of Lubrication". (McGraw-Hill Book Company, Inc.). The use of a spring-loaded piston to create seal lubricant over-pressure in an oilfield downhole drilling tool can be traced to Herbert W. "Herb" Beimgraben's U.S. Pat. No. 4,372,400, "Apparatus for applying pressure to fluid seals". These two methods of producing lubricant over-pressure to improve the abrasion resistance of hydrodynamic rotary seals have long been taught by the "Kalsi Seals Handbook" published by assignee Kalsi Engineering. The sealing element 4 of FIG. 1 herein was designed for use with the lubricant over-pressure taught by this conventional wisdom. In FIG. 1, the first fluid 16 is preferably a seal lubricant, the second fluid 18 may be an abrasive fluid such as oilfield drilling fluid, and the pressure of the first fluid 16 is preferably greater than the pressure of the second fluid. As taught by the prior art in the "Kalsi Seals Handbook", the purpose of this lubricant over-pressure arrangement is to maintain the circularity of the exclusionary corner 66. An issue with such lubricant over-pressure arrangements is that the sealing surface 14 may wobble during rotation (i.e., the sealing surface 14 may have dynamic runout) and the friction between the seal body second end 28 and the housing groove wall 30 may inhibit the ability of the exclusionary corner 66 to follow the wobble.

Contrary to the conventional wisdom described above, the sealing element 4 of FIGS. 5 and 7 herein is designed for and intended for use with lubricant "under-pressure", where the pressure of the seal lubricant is less than the pressure of the abrasive fluid. In FIGS. 5 and 7, the second fluid 18 is preferably a seal lubricant, the first fluid 16 may be an abrasive fluid such as oilfield drilling fluid, and the pressure of the first fluid 16 is preferably greater than the pressure of the second fluid 18.

The inventors have discovered that contrary to conventional wisdom, when the sealing element 4 shown in FIGS. 5 and 7 is exposed to a first fluid 16 having a pressure that is 100 psi greater than the pressure of the second fluid 18, the sealing element 4 excludes abrasives much better than prior art hydrodynamic rotary seals used with lubricant over-pressure. This is believed to be because the seal body first end 26 nearest the exclusionary corner 66 is not being forced against the groove wall 30 by differential pressure, and therefore experiences no wall contact-related friction. This lack of friction is believed to allow the exclusionary corner 66 to better follow the dynamic runout of the sealing surface 14, improving the ability of the exclusionary corner 66 to exclude abrasives.

Figure 8:
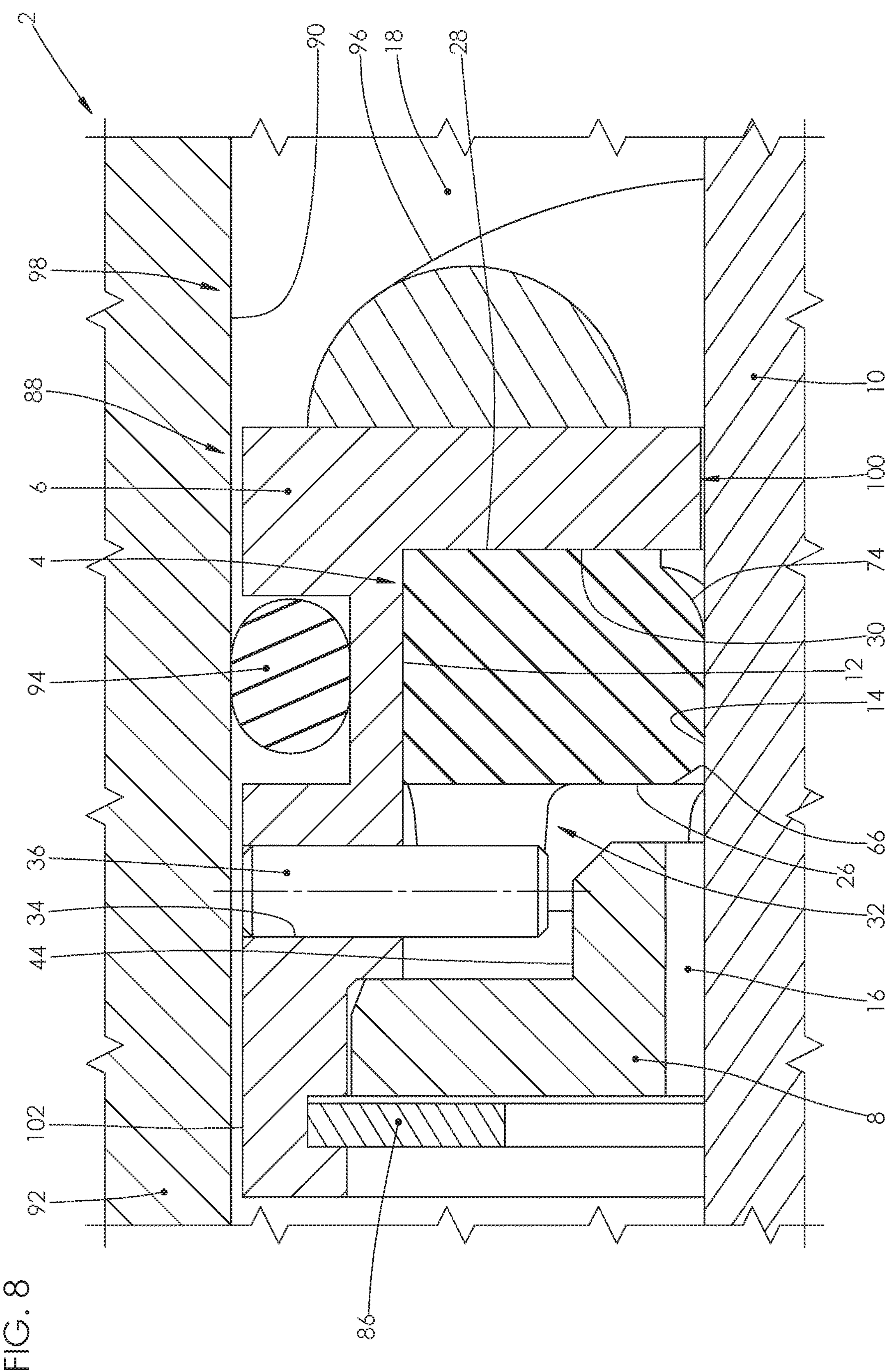
FIGS. 8, 9, 10, 11 and 12 are fragmentary cross-sectional views of rotary shaft sealing assemblies according to other preferred embodiments of the present invention.
Figure 9:
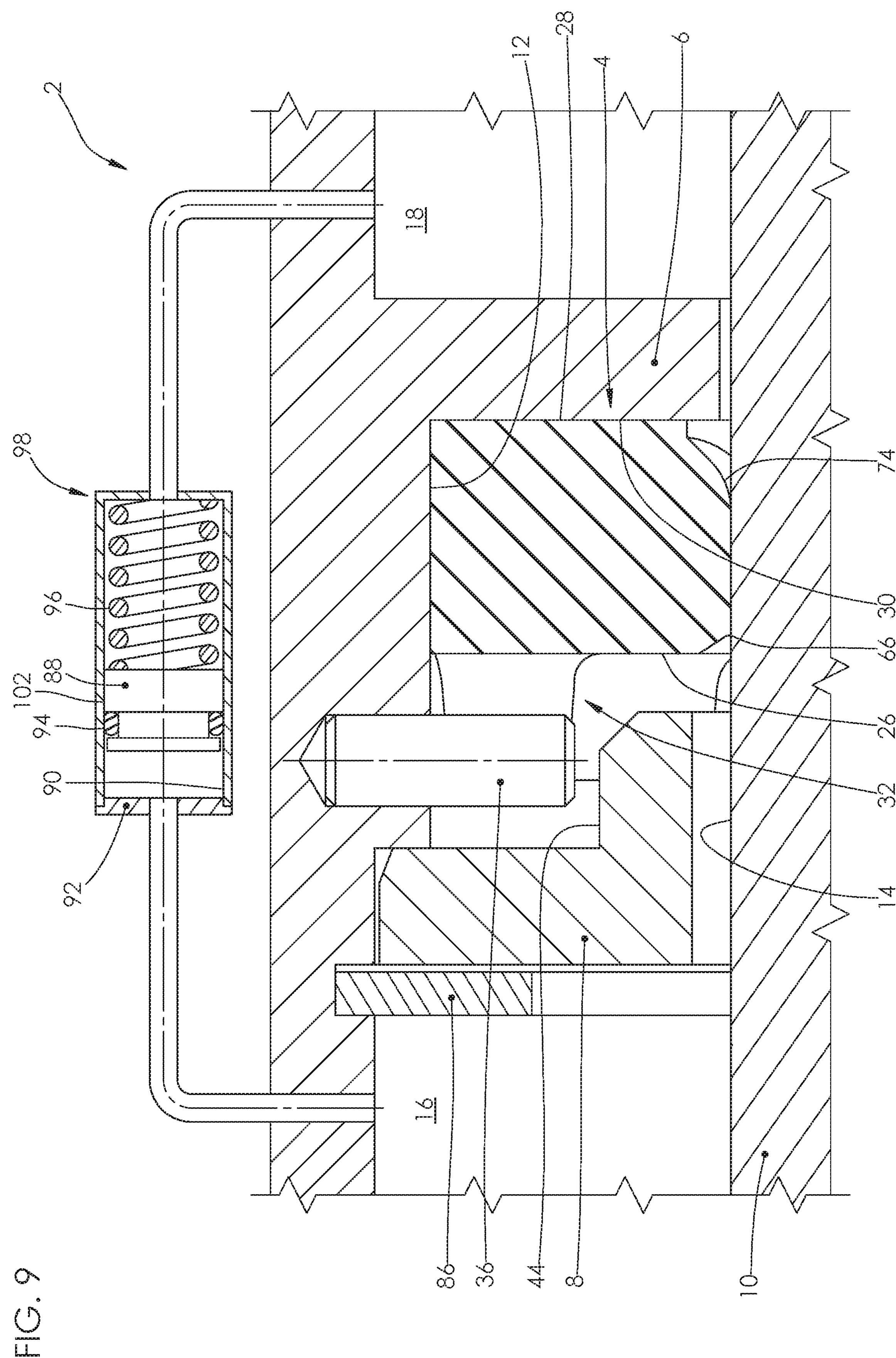
Figure 10:
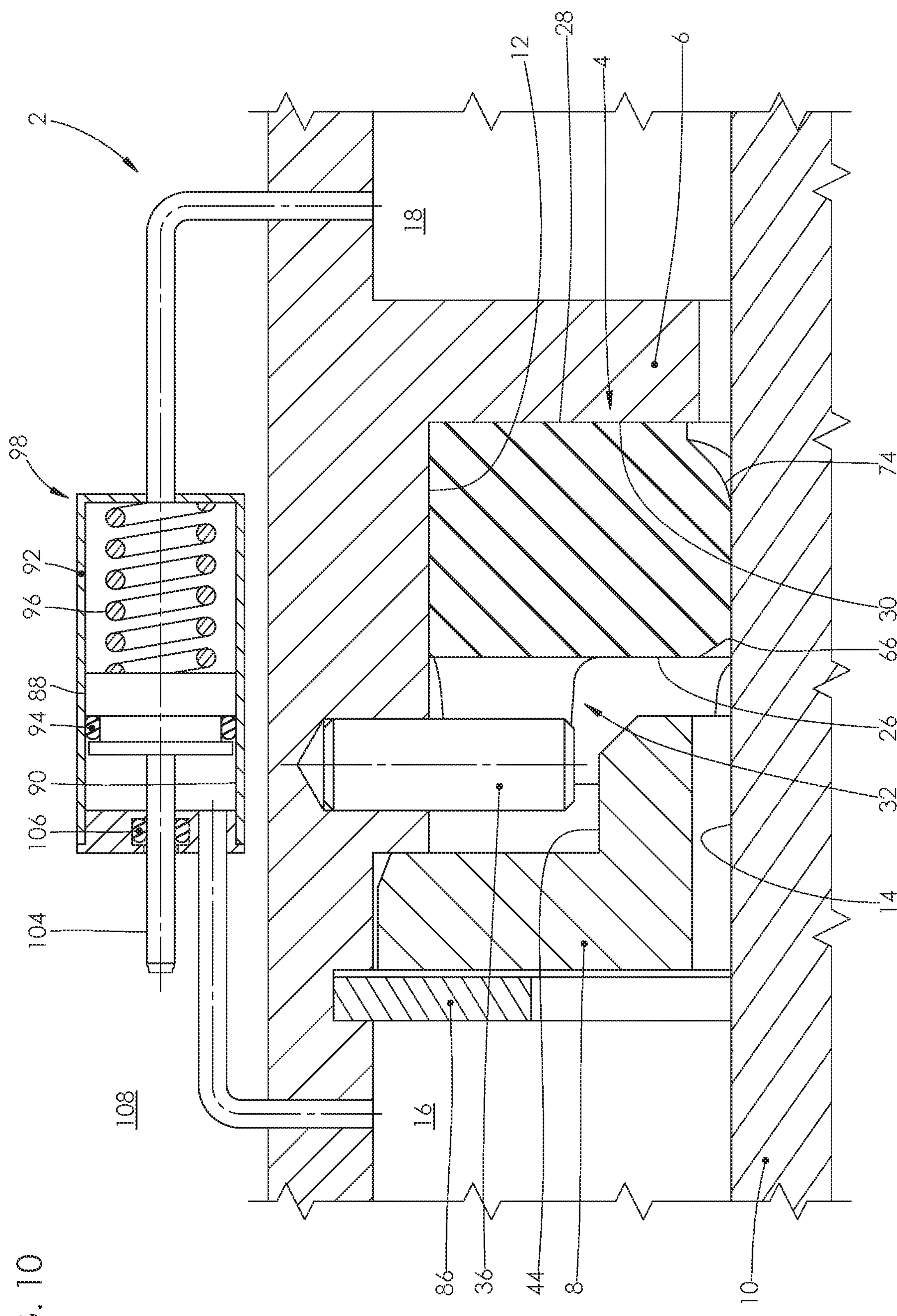

As described in conjunction with FIGS. 8 to 10, the rotary shaft sealing assembly 2 of the present invention can include a lubricant reservoir that produces lubricant under-pressure via a differential area piston or a spring-loaded piston, or a differential area piston that is also acted on by a spring. As another example of a lubricant under-pressure arrangement, the first fluid 16 could be a process fluid at a pressure greater than atmospheric pressure, and the second fluid 18 could be a gravity fed seal lubricant at or near atmospheric pressure.

Description of FIG. 8

FIG. 8 shows a preferred embodiment of the rotary shaft sealing assembly 2 wherein the seal housing 6 and the shelf member 8 are retained together by any suitable means, such as the retaining ring 86 that is illustrated, and together with the at least one restraint 36 form a piston shown generally at 88 that is axially movable relative to the rotatable shaft 10. The piston 88 is in fluid communication with the first fluid 16 and the second fluid 18.

The piston 88 is sealed with respect to a reservoir bore 90 of a reservoir housing 92 by a sliding seal 94 that is in radial compression between the reservoir bore 90 and the piston 88. By virtue of the sliding seal 94, the piston 88 sealably and slidably engages the reservoir bore 90.

Preferably, the sealing element 4 is in radial compression between and establishes a sealed relationship with the groove bore 12 and the sealing surface 14. Together, the sealing element 4 and the sliding seal 94 partition the first fluid 16 from the second fluid 18. The second fluid 18 is preferably a lubricant, and the first fluid 16 may be an abrasive-laden fluid such as oilfield drilling fluid. The pressure of the first fluid 16 produces an axially-acting hydraulic force that acts on the piston 88 in a direction toward the second fluid 18, imparting pressure in the second fluid 18. A spring 96 pushes on the piston 88 in a direction toward the first fluid 16, causing the pressure of the second fluid 18 to be less than the pressure of the first fluid 16; i.e., the spring 96 produces a lubricant under-pressure condition. Another way of describing the lubricant pressurization system is that a spring 96 moves the piston 88 in a direction to decrease the pressure of the second fluid 18 to a value which is less than the pressure value of the first fluid 16—contrary to the conventional wisdom traceable to Thomsen and Beimgraben.

The annular space between the reservoir bore 90 and the sealing surface 14 forms a lubricant reservoir shown generally at 98. Ignoring friction, the pressure of the second fluid 18 is equal to the pressure of the first fluid 16 minus the circular area of the lubricant reservoir 98 times the axial force of the spring 96. In other words, ignoring friction, the sealing element 4 is exposed to a differential pressure equal to the circular area of the lubricant reservoir 98 times the axial force of the spring 96. This differential pressure holds the seal body second end 28 against the housing groove wall 30, which helps to maintain the exclusionary corner 66 in a generally circular configuration, for enhanced exclusionary function. If not for this differential pressure, the typically high rate of differential thermal expansion between the sealing element 4 and the seal housing 6 could cause significant waviness of the exclusionary corner 66 and associated reduced exclusionary function.

Owing to the axial location of the sliding seal 94, the mounting hole 34 can be drilled in a radially inward direction from the outside of the seal housing 6, without producing a leakage path. The at least one restraint 36 blocks the at least one tang 32 from rotating, thereby preventing the sealing element 4 from rotating relative to the seal housing 6, and thereby preventing slippage-related wear of the groove bore 12 and the housing groove wall 30. Preferably, the shelf outer surface 44 and the reservoir bore 90 block the restraint 36 from escaping from the mounting hole 34.

The sealing element 4 is identical to the sealing element 4 portrayed in FIGS. 5, 6, 7, 9, 10, and 11 wherein the at least one tang 32 is exposed to the first fluid 16 and the inlet curvature 74 is exposed to the second fluid 18. The exclusionary corner 66 is axially remote from the contact and friction between the seal body second end 28 and the housing groove wall 30. The flexibility of the seal material between the exclusionary corner 66 and the seal body second end 28 allows the exclusionary corner 66 to more accurately follow wobble of the sealing surface 14, compared to seals where the exclusionary corner 66 is axially close to the contact and friction between the seal body second end 28 and the housing groove wall 30. If the second fluid 18 is a seal lubricant, the contact between the seal body second end 28 and the housing groove wall 30 occurs in a lubricant flooded zone, which reduces friction and wear associated with shaft wobble-induced radial motion between the seal body second end 28 and the housing groove wall 30. The reduced friction between the seal body second end 28 and the housing groove wall 30 facilitates the ability of the exclusionary corner 66 to follow the wobble of the sealing surface 14 of the rotatable shaft 10.

Preferably, the piston 88 is located radially with respect to the sealing surface 14 by a journal bearing bore 100 that is exposed to and lubricated by the second fluid 18 and causes the piston 88 to move laterally to accommodate the lateral movement/wobble of the sealing surface 14. This ability of the piston 88 to follow wobble reduces the amount of radial sliding between the seal body second end 28 and the housing groove wall 30, further increasing the ability of the exclusionary corner 66 to maintain proper engagement with the sealing surface 14. The reader should understand that the axial length of the journal bearing bore is not necessarily drawn to accurate scale.

Preferably, the piston 88 has an outer peripheral surface 102 that faces radially outward toward the reservoir bore 90 and radially away from the sealing surface 14. Preferably the reservoir bore 90 is a cylindrical surface that faces radially inward toward and encircles the sealing element 4, seal housing 6, shelf member 8, rotatable shaft 10, groove bore 12, sealing surface 14, first fluid 16, second fluid 18, seal body second end 28, housing groove wall 30, the at least one tang 32, the at least one mounting hole 34, the at least one restraint 36, exclusionary corner 66, inlet curvature 74, retaining ring 86, piston 88, sliding seal 94, spring 96, lubricant reservoir 98, journal bearing bore 100, and outer peripheral surface 102. Preferably, friction between the sliding seal 94 and the seal housing 6 and friction between the reservoir bore 90 and the sliding seal 94 prevents the seal housing 6 from rotating with the rotatable shaft 10—although it is understood that supplemental means can be added, such as additional sliding seals or an anti-rotation feature of the seal housing 6 engaging an anti-rotation feature of the reservoir housing 92. For example, a projection from the seal housing 6 could engage a recess in the reservoir housing 92, or vice versa, to prevent the piston 88 from rotating with the rotatable shaft 10. The spring 96 can be any suitable type of spring, such as the compression-type helical coil spring that is illustrated, and may be located radially outward of and encircle the rotatable shaft 10 if desired. Preferably, the end of the spring 96 that contacts the piston 88 is closed and ground square.

In FIG. 8, the piston 88 is annular and encircles the shaft. Spring-loaded pistons are also possible where the piston is not annular, as shown in FIGS. 9 and 10.

Description of FIG. 9

FIG. 9 shows a preferred embodiment of the rotary shaft sealing assembly 2 wherein the seal housing 6 and the shelf member 8 are retained together by any suitable means, such as the retaining ring 86 that is illustrated. A piston 88 is sealed with respect to a reservoir bore 90 of a reservoir housing 92 by a sliding seal 94 that is in radial compression between the reservoir bore 90 and the piston 88. ANSI Y14.3-1975 has been interpreted to mean that the piston 88 should not be sectioned because the piston 88 has no internal detail to be conveyed. Preferably an outer peripheral surface 102 of the piston 88 faces radially outward toward and is encircled by the reservoir bore 90. Preferably, the piston 88 is located within the reservoir bore 90. It should be understood that the lubricant reservoir 98 is drawn schematically.

Preferably, the sealing element 4 is in radial compression between and establishes a sealed relationship with the groove bore 12 and the sealing surface 14. The sealing element 4 and the sliding seal 94 partition the first fluid 16 from the second fluid 18. The second fluid 18 is preferably a lubricant, and the first fluid 16 may be an abrasive laden fluid such as oilfield drilling fluid. The pressure of the first fluid 16 produces an axially-acting hydraulic force that acts on the piston 88 in a direction toward the second fluid 18, imparting pressure in the second fluid 18. A spring 96 pushes on the piston 88 in a direction toward the first fluid 16, causing the pressure of the second fluid 18 to be less than the pressure of the first fluid 16; i.e., the spring 96 produces a lubricant under-pressure condition.

Part of the space within the reservoir bore 90 forms a lubricant reservoir shown generally at 98. Ignoring friction, the pressure of the second fluid 18 is equal to the pressure of the first fluid 16 minus the circular area of the lubricant reservoir 98 times the axial force of the spring 96. In other words, ignoring friction, the sealing element 4 is exposed to a differential pressure equal to the circular area of the lubricant reservoir 98 times the axial force of the spring 96. This differential pressure holds the seal body second end 28 against the housing groove wall 30, which helps to maintain the exclusionary corner 66 in a generally circular configuration, for enhanced exclusionary function. If not for this differential pressure, the typically high rate of differential thermal expansion between the sealing element 4 and the seal housing 6 could cause significant waviness of the exclusionary corner 66 and associated reduced exclusionary function.

The at least one restraint 36 blocks the at least one tang 32 from rotating, thereby preventing the sealing element 4 from rotating relative to the seal housing 6, and thereby preventing slippage-related wear of the groove bore 12 and the housing groove wall 30.

The sealing element 4 is identical to the sealing element 4 portrayed in FIGS. 5, 6, 7, 8, 10, and 11 wherein the tangs are exposed to the first fluid 16 and the inlet curvature 74 is exposed to the second fluid 18. The exclusionary corner 66 is axially remote from the contact and friction between the seal body second end 28 and the housing groove wall 30. The flexibility of the seal material between the exclusionary corner 66 and the seal body second end 28 allows the exclusionary corner 66 to more accurately follow wobble/runout of the sealing surface 14, compared to seals where the exclusionary corner 66 is axially close to the contact and friction between the seal body second end 28 and the housing groove wall 30. If the second fluid 18 is a seal lubricant, the contact between the seal body second end 28 and the housing groove wall 30 occurs in a lubricant flooded zone, which reduces friction and wear associated with wobble-induced radial motion between the seal body second end 28 and the housing groove wall 30. The reduced friction between the seal body second end 28 and the housing groove wall 30 facilitates the ability of the exclusionary corner 66 to follow the wobble of the sealing surface 14 and exclude the first fluid 16. If desired, the seal body second end 28 and the housing groove wall 30 can be coated or otherwise treated to reduce sliding friction between the seal body second end 28 and the housing groove wall 30, since the prevention of rotation between the seal body second end 28 and the housing groove wall 30 is provided by the at least one tang 32 and the at least one restraint 36, and is not dependent on the friction between the seal body second end 28 and the housing groove wall 30. If desired as a friction-reducing measure, a plastic washer, such as a PTFE-based washer, can be interposed between the seal body second end 28 and the housing groove wall 30 as a friction-reducing measure, and to protect the housing groove wall 30 from radial sliding-related wear.

Preferably the reservoir bore 90 is a cylindrical surface that faces radially inward toward and encircles the piston 88, sliding seal 94, and spring 96. The spring 96 can be any suitable type of spring, such as the compression-type helical coil spring that is illustrated. The spring 96 is preferably exposed to and immersed in the second fluid 18.

Description of FIG. 10

FIG. 10 shows a preferred embodiment of the rotary shaft sealing assembly 2 wherein the seal housing 6 and the shelf member 8 are retained together by any suitable means, such as the retaining ring 86 that is illustrated.

A piston 88 having a piston rod 104 is sealed with respect to a reservoir housing 92 by a sliding seal 94 that is in radial compression between the reservoir bore 90 and the piston 88, and by a rod seal 106 that is in radial compression between the reservoir housing 92 and the piston rod 104. ANSI Y14.3-1975 has been interpreted to mean that the piston 88 should not be sectioned because the piston 88 has no internal detail to be conveyed. The piston 88 is in fluid communication with the first fluid 16 and the second fluid 18.

Part of the space within the reservoir bore 90 forms a lubricant reservoir shown generally at 98. It should be understood that the reservoir housing 92 is drawn schematically.

The sealing element 4 is in radial compression between and establishes a sealed relationship with the groove bore 12 of the seal housing 6 and the sealing surface 14 of the rotatable shaft 10. The sealing element 4 and the sliding seal 94 partition the first fluid 16 from the second fluid 18. The rod seal 106 partitions the first fluid 16 from a third fluid 108, such as the atmosphere.

The second fluid 18 is preferably a lubricant, and the first fluid 16 may be an abrasive-laden fluid such as oilfield drilling fluid.

A first hydraulic area on the rod side of the piston 88 is defined by the transverse area between the piston rod 104 and the reservoir bore 90. A second hydraulic area on the opposite side of the piston is defined by the transverse area of the reservoir bore 90. The pressure of the first fluid 16 acts over the first hydraulic area and produces an axially-acting hydraulic force that acts on the piston 88 in a direction toward the second fluid 18, imparting pressure in the second fluid 18. Since the second hydraulic area is greater than the first hydraulic area, the pressure of the second fluid 18 is less than the pressure of the first fluid 18. In other words, the difference in hydraulic area between the two sides of the piston 88 produces a lubricant under-pressure condition. This differential pressure holds the seal body second end 28 against the housing groove wall 30, which helps to maintain the exclusionary corner 66 in a generally circular configuration, for enhanced exclusionary function.

If desired, a spring 96 can push on the piston 88 in a direction toward the first fluid 16, further causing the pressure of the second fluid 18 to be less than the pressure of the first fluid 16. The use of the spring 96 helps to keep the seal body second end 28 in position against the housing groove wall 30 even when the pressure of the first fluid 16 is zero. Preferably the spring 96 is immersed in the second fluid 18, however arrangements are possible where the spring 96 encircles the piston rod 104 and is immersed in the third fluid 108.

The at least one restraint 36 blocks the at least one tang 32 from rotating, thereby preventing the sealing element 4 from rotating relative to the seal housing 6, and thereby preventing slippage-related wear of the groove bore 12 and the housing groove wall 30.

The sealing element 4 is identical to the sealing element 4 portrayed in FIGS. 5, 6, 7, 8, 9, and 11 wherein the tangs 32 are exposed to the first fluid 16 and the inlet curvature 74 is exposed to the second fluid 18. The exclusionary corner 66 is axially remote from the contact and friction between the seal body second end 28 and the housing groove wall 30. The flexibility of the seal material between the exclusionary corner 66 and the seal body second end 28 allows the exclusionary corner 66 to more accurately follow shaft wobble, compared to seals where the exclusionary corner 66 is axially close to the contact and friction between the seal body second end 28 and the housing groove wall 30. If the second fluid 18 is a seal lubricant, the contact between the seal body second end 28 and the housing groove wall 30 occurs in a lubricant flooded zone, which reduces friction and wear associated with wobble-induced radial motion between the seal body second end 28 and the housing groove wall 30. The reduced friction between the seal body second end 28 and the housing groove wall 30 facilitates the ability of the exclusionary corner 66 to follow the wobble of the sealing surface 14 and exclude the first fluid 16.

Preferably the reservoir bore 90 is a cylindrical surface that faces radially inward toward and encircles the piston 88, sliding seal 94, and spring 96. The spring 96 can be any suitable type of spring, such as the compression-type helical coil spring that is illustrated.

Figure 11:
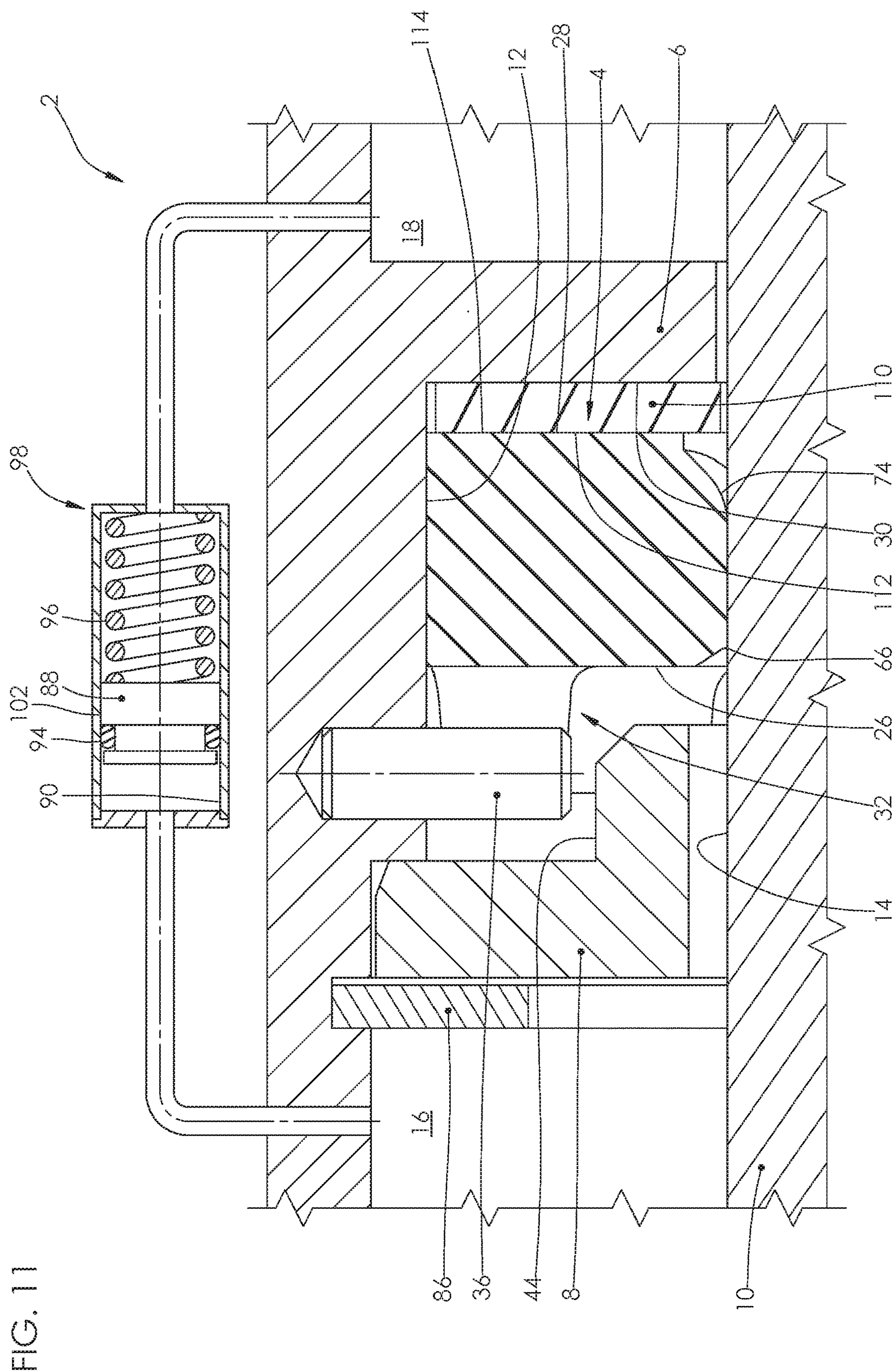

Description of FIG. 11

The rotary shaft sealing assembly 2 of FIG. 11 is nearly identical to that shown by FIG. 9, the main difference being that in FIG. 11 a plastic washer 110 is interposed between the seal body second end 28 and the housing groove wall 30 as a friction reduction measure. With the plastic washer 110 in place, when the sealing surface 14 wobbles, the seal body second end 28 slides radially against the plastic washer 110 or causes the plastic washer to slide radially against the housing groove wall 30, rather than the seal body second end 28 sliding against the housing groove wall 30. The plastic washer 110 is manufactured from a material selected for having relatively low friction with elastomers and metals. For example, the plastic washer 110 might be constructed from PTFE or carbon-graphite reinforced PTFE. The frictional reduction provided by the plastic washer 110 allows the sealing element 4 to more easily follow wobble/runout of the sealing surface 14, enhancing the exclusionary function of the exclusionary corner 66 and thereby protecting the sealing element 4 from third body wear. Preferably, the plastic washer 110 has a first washer end 112 of generally planar form facing axially toward and abutting the seal body second end 28, and has a second washer end 114 of generally planar form facing axially toward and abutting the housing groove wall 30.

For orientation purposes, the seal housing 6, shelf member 8, rotatable shaft 10, groove bore 12, first fluid 16, second fluid 18, tang 32, restraint 36, shelf outer surface 44, inlet curvature 74, retaining ring 86, piston 88, reservoir bore 90, sliding seal 94, spring 96, lubricant reservoir 98, and outer peripheral surface 102 are labeled in FIG. 11.

Figure 12:
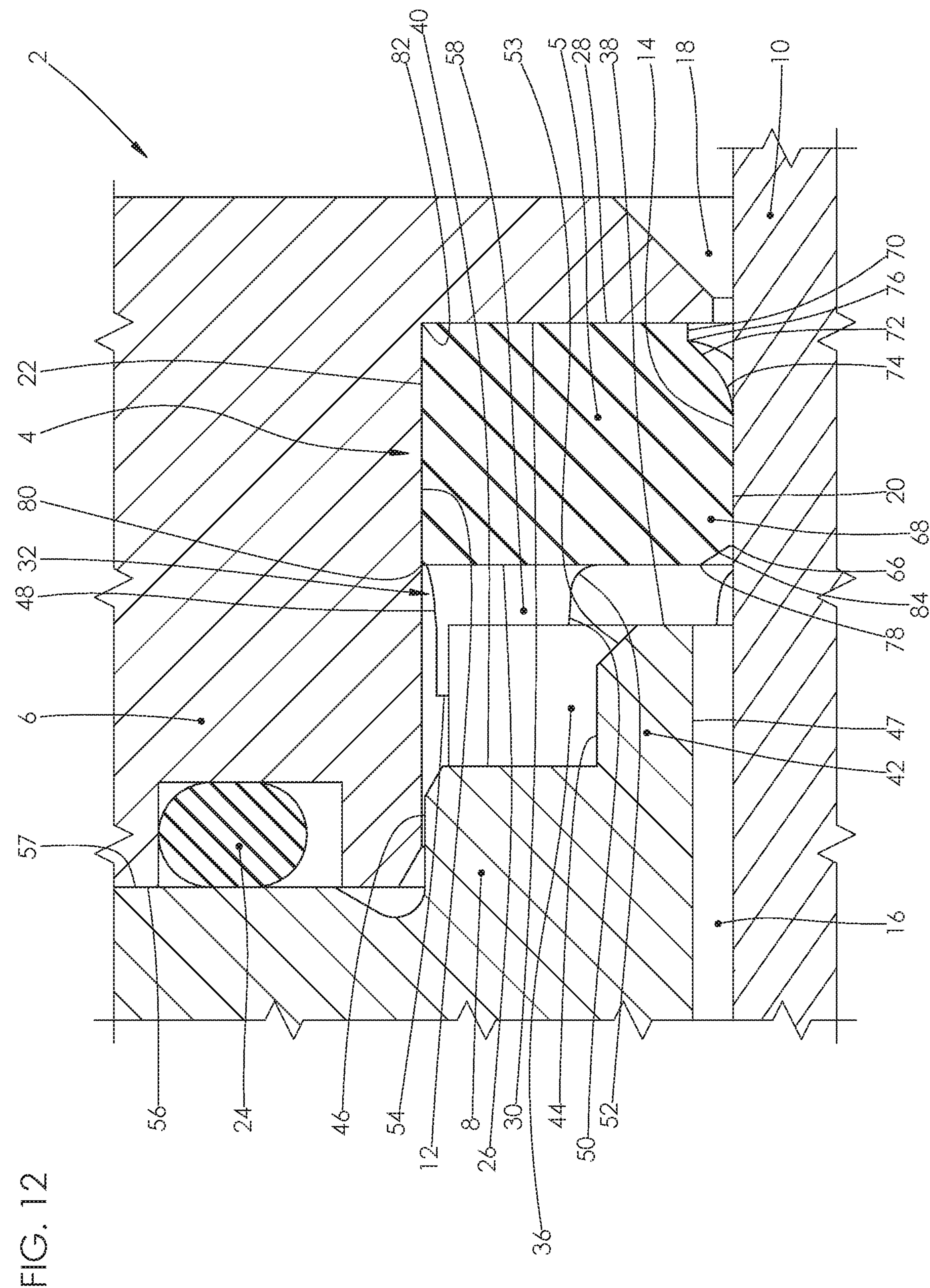

Description of FIG. 12

FIG. 12 is a fragmentary cross-sectional view of a preferred rotary shaft sealing assembly that is shown generally at 2. A sealing element 4 having a seal body 5 of annular form is located axially between a seal housing 6 and a shelf member 8 and is located radially between a portion of the seal housing 6 and a portion of a rotatable shaft 10. Although the sealing element 4 is the same as shown in FIGS. 5 to 11, the sealing element 4 shown in FIGS. 1 to 3 could be substituted if desired.

Preferably, the sealing element 4 is located between and radially compressed between and establishes sealing contact with the groove bore 12 of the seal housing 6 and the sealing surface 14 of the rotatable shaft 10 and partitions the first fluid 16 from the second fluid 18. The dynamic sealing surface 20 of the sealing element 4 preferably establishes the sealing contact with the sealing surface 14, and the static sealing surface 22 of the sealing element 4 preferably establishes sealing contact with the groove bore 12.

Preferably, the seal body first end 26 faces in a generally axial direction toward the shelf member 8, and the seal body second end 28 faces in a generally axial direction away from the shelf member 8 and toward and adjoining the housing groove wall 30 of the seal housing 6. Preferably, at least one tang 32 projects from the seal body first end 26 in a generally axial direction toward the shelf member 8.

Preferably, the assembly has at least one restraint 36. In most cases more than one restraint 36, arranged in a circular pattern, will be used. If desired, the restraint 36 can be integral to the shelf member 8, as shown. ANSI Y14.3-1975 has been interpreted to mean that the restraint 36 should not be sectioned to avoid conveying a false sense of circumferential solidity.

Preferably, each restraint 36 has a portion thereof that is circumferentially aligned with at least one tang 32 and blocks the tang 32 and sealing element 4 from rotating with the rotatable shaft 10. Preferably, in the typical assembly with more than one restraint 36 and more than one tang 32, each restraint 36 is located circumferentially between a first and a second tang 32, and each tang 32 is located circumferentially between a first and a second restraint 36, and there are as many of the restraint 36 as there are of the tang 32. In other words, preferably, in the typical case where there is more than one tang 32 and more than one restraint 36, a portion of each tang 32 is situated in circumferentially intermediate location to a pair of restraints 36 and a portion of each restraint 36 is situated in circumferentially intermediate location to a pair of tangs 32.

Preferably, the housing groove wall 30 faces in a generally axial direction toward and adjoins the seal body second end 28, and facing toward the seal body first end 26, the at least one tang 32, and the at least one restraint 36. The sealing element 4 is illustrated in the axial position it attains when the pressure of the first fluid 16 is greater than the pressure of the second fluid 18.

Preferably, the shelf member 8 defines a shelf 42 that is an annular feature projecting in an axial direction toward the sealing element 4 and the housing groove wall 30. Preferably, the shelf member 8 has an inner groove wall 38 and an outer groove wall 40 that are axially offset from one another. Preferably, the inner groove wall 38 is an end surface of the shelf 42 and faces in a generally axial direction toward the seal body first end 26 and the housing groove wall 30. Preferably, the outer groove wall 40 faces in a generally axial direction toward each tang 32 and faces in a generally axial direction toward the seal body first end 26 and the housing groove wall 30.

Preferably, the shelf member 8 has a pilot surface 46 that is located radially inward from and within and faces radially outward toward and adjoins a portion of the groove bore 12, locating the shelf member 8 and groove bore 12 laterally with respect to one another. Preferably, the shelf member 8 has a shelf bore 47 that faces generally radially inward toward and encircles a portion of the rotatable shaft 10.

Preferably, each tang 32 has an outer peripheral surface 48 that faces generally radially outward toward the groove bore 12 and away from the sealing surface 14. Preferably each tang 32 has an inner peripheral surface 50 that faces generally radially inward away from the groove bore 12 and generally toward the shelf 42, the shelf outer surface 44, and the sealing surface 14. Preferably, the inner peripheral surface 50 is blended to the seal body first end 26 with a tang fillet 52 that is generally concave.

Preferably, the shelf 42 incorporates a corner break 53 between the shelf outer surface 44 and the inner groove wall 38 to provide clearance for the tang fillet 52 in circumstances where the seal body first end 26 is forced into contact with the inner groove wall 38. Preferably, the corner break 53 faces generally toward the tang fillet 52.

Preferably each of the tangs 32 has a first circumferential end 58 that faces in a generally circumferential direction toward a restraint 36. Preferably, each tang 32 has an axial tang end 54 that faces generally toward the outer groove wall 40.

Preferably, the seal housing 6 has a housing indexing surface 56 of generally planar form that faces in a generally axial direction toward the shelf member 8 and the shelf member 8 has a shelf member indexing surface 57 of generally planar form that faces in a generally axial direction toward and abuts the housing indexing surface 56.

Preferably, the dynamic sealing surface 20 is annular, varies in axial width around the circumference of the sealing element 4, and terminates at exclusionary corner 66. Preferably, the dynamic sealing surface 20 is an inner peripheral surface of a dynamic sealing lip 68 that projects radially inward from an inner body surface 70 of the sealing element 4. Preferably, the dynamic sealing lip 68 has an angled flank 72 that is situated in axially intermediate relation to the inner body surface 70 and the dynamic sealing surface 20 at any axial cross-section of the sealing element 4.

Preferably, the dynamic sealing lip 68 has an inlet curvature 74 of generally convex form that is situated in axially intermediate location to the angled flank 72 and the dynamic sealing surface 20 at any axial cross-section of the sealing element 4. Preferably, the axial distance between the inlet curvature 74 and the exclusionary corner 66 varies around the circumference of the seal. Preferably, the angled flank 72 terminates at a wavy intersection 76 with the inner body surface 70. Preferably, the seal body first end 26 has an inner peripheral edge 78 and an outer peripheral edge 80 of annular form.

Preferably, the at least one tang 32 is situated in intermediate radial relation to and between the inner peripheral edge 78 and the outer peripheral edge 80 and closer to the outer peripheral edge 80 than the inner peripheral edge 78, allowing space for the shelf 42 to provide axial support to the seal body 5 (via contact with the seal body first end 26) during installation of the sealing element 4 onto the sealing surface 14, and when the pressure of the second fluid 18 is greater than the pressure of the first fluid 16. The static seal 24, gland corner 82, and angled transitional geometry 84 are identified for orientation purposes.

Figure 12A:
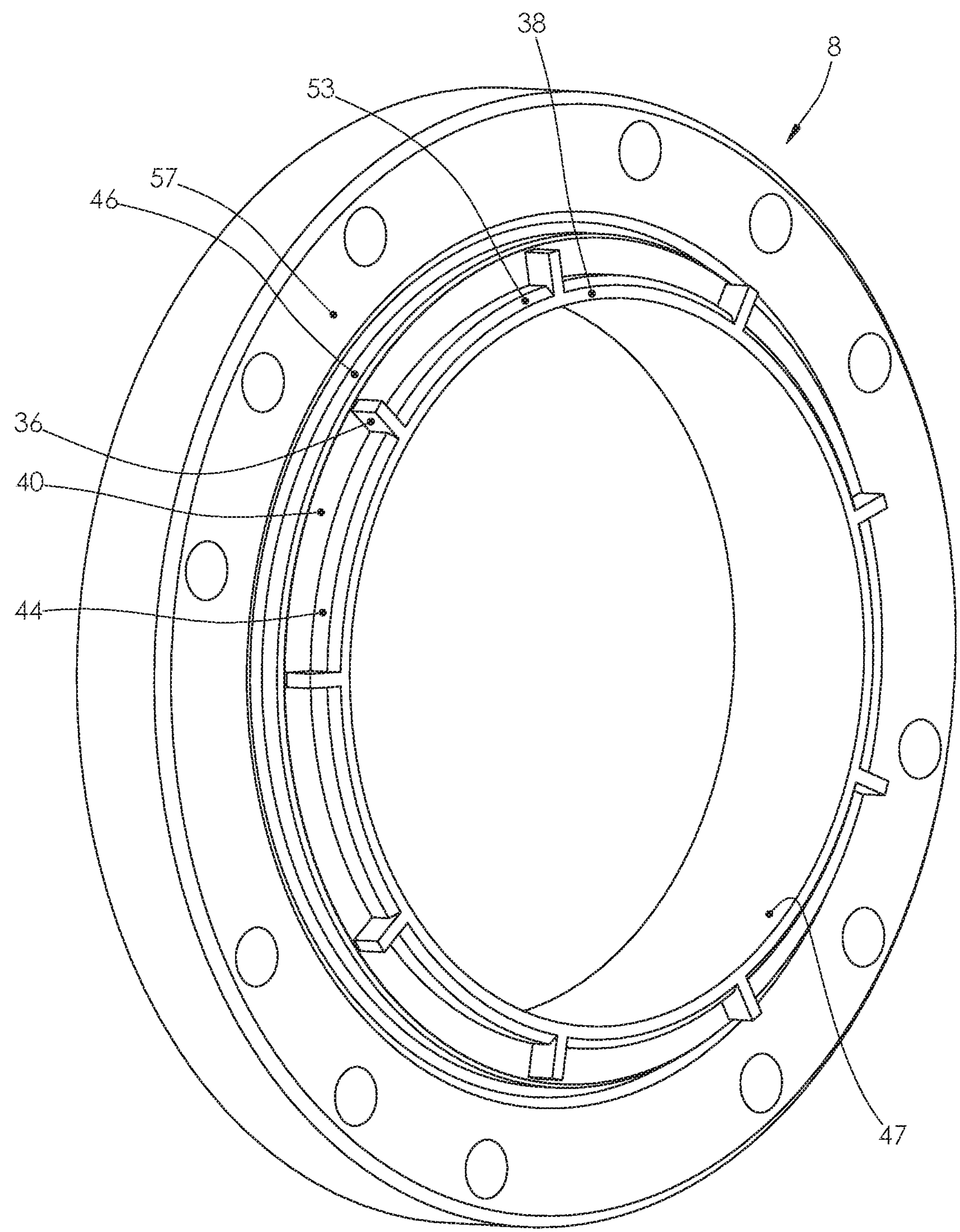
FIG. 12A is a perspective view of a shelf member of the rotary shaft sealing assembly of FIG. 12.

Description of FIG. 12A

FIG. 12A is a perspective view of the shelf member 8 that is illustrated in FIG. 12. FIG. 12A is included to illustrate that the at least one restraint 36 can be integral to the shelf member 8 and can be a plurality of restraints 36 arranged in a circular pattern. The inner groove wall 38, outer groove wall 40, shelf outer surface 44, pilot surface 46, shelf bore 47, corner break 53, and shelf member indexing surface 57 are identified for orientation purposes.

In the preferred embodiments of the present invention, if the pressure of the second fluid 18 is greater than the pressure of the first fluid 16, the sealing element 4 is well-supported by contact between the seal body first end 26 and the inner groove wall 38, and by contact between the seal body first end 26 and the at least one restraint 36, and by contact between the axial tang end 54 and the outer groove wall 40.

In the arrangements of FIGS. 5 and 7-12, the seal body first end 26 that is located near the exclusionary corner 66 is normally not in contact with the inner groove wall 38. As a result, the exclusionary corner 66 is free to more accurately follow the runout-related radial motion of the rotatable shaft 10.

In the arrangements of FIGS. 5 and 7-12, the exclusionary corner 66 is axially remote from the clearance between the shelf bore 47 and the sealing surface 14, and therefore is isolated and protected from any hydraulic pressure generated by changes in the clearance between the shelf bore 47 and the sealing surface 14. Furthermore, the hydraulic pressure effect is minimal because the clearance between the shelf bore 47 and the sealing surface 14 can be relatively large.

Although the arrangements shown in FIGS. 8-11 have a spring and/or piston so that the pressure of the first fluid 16 is always greater than the pressure of the second fluid 18, the shelf member 8 still serves a support purpose is certain instances. The sealing element 4 can slide within the groove during assembly onto the shaft 10, and with one possible direction of installation would contact the inner groove wall 38, and might also contact the restraints 36. The axial tang end 54 could also contact and be supported by the outer groove wall 40 during assembly onto the shaft 10. During assembly onto the shaft 10, the sealing element 4 is pushed over an installation chamfer (not shown) that gradually wedges and compresses the sealing element 4 onto the sealing surface 14 of the rotatable shaft 10. The force required to push the sealing element 4 over the installation chamfer could twist and flip the sealing element 4 within the groove if not for the presence of the inner groove wall 38. Moreover, if the tangs 32 contacted the outer groove wall 40 during installation and the inner groove wall 38 of the shelf 42 was not present, the sealing element 4 would very likely twist such that the second end 28 of the sealing element 4 faced radially inward toward the sealing surface 14 of the rotatable shaft 10, which is not the intended installed orientation.

In preferred embodiments in which the restraint 36 is a pin, the pin has a generally cylindrical shape that is far less likely to damage the tang 32.

NOMENCLATURE rotary shaft sealing assembly 2
sealing element 4
seal body 5
seal housing 6
shelf member 8
rotatable shaft 10
groove bore 12
sealing surface 14
first fluid 16
second fluid 18
dynamic sealing surface 20
static sealing surface 22
static seal 24
seal body first end 26
seal body second end 28
housing groove wall 30
tang 32
mounting hole 34
restraint 36
inner groove wall 38
outer groove wall 40
shelf 42
shelf outer surface 44
pilot surface 46
shelf bore 47
outer peripheral surface 48
inner peripheral surface 50
tang fillet 52
corner break 53
axial tang end 54
housing indexing surface 56
shelf member indexing surface 57
first circumferential end 58
second circumferential end 60
first end fillet 62
second end fillet 64
exclusionary corner 66
dynamic sealing lip 68
inner body surface 70
angled flank 72
inlet curvature 74
wavy intersection 76
inner peripheral edge 78
outer peripheral edge 80
gland corner 82
chamber 83
angled transitional geometry 84
valve 85
retaining ring 86
vacuum pump 87
piston 88
reservoir bore 90
reservoir housing 92
sliding seal 94
spring 96
lubricant reservoir 98
journal bearing bore 100
outer peripheral surface 102
piston rod 104
rod seal 106
third fluid 108
plastic washer 110
first washer end 112
second washer end 114

CONCLUSION

In view of the foregoing it is evident that the embodiments of the present invention are adapted to attain some or all of the aspects and features hereinabove set forth, together with other aspects and features which are inherent in the apparatus disclosed herein.

Even though several specific geometries are disclosed in detail herein, many other geometrical variations employing the basic principles and teachings of this invention are possible. The foregoing disclosure and description of the invention are illustrative and explanatory thereof, and various changes in the size, shape and materials, as well as in the details of the illustrated construction, may be made without departing from the spirit of the invention. The present embodiments are, therefore, to be considered as merely illustrative and not restrictive, the scope of the invention being indicated by the claims rather than the foregoing description, and all changes which come within the meaning and range of equivalence of the claims are therefore intended to be embraced therein.

While the invention has been described in detail above with reference to specific embodiments, it will be understood that modifications and alterations in the embodiments disclosed may be made by those practiced in the art without departing from the spirit and scope of the invention. All such modifications and alterations are intended to be covered. In addition, all publications cited herein are indicative of the level of skill in the art and are hereby incorporated by reference in their entirety as if each had been individually incorporated by reference and fully set forth.

We claim:

1. A rotary shaft sealing assembly (2) comprising:

a rotatable shaft (10) having a sealing surface (14) of generally cylindrical form facing generally radially outward;

a seal housing (6) of annular form located radially outward of and encircling said rotatable shaft (10), and having a groove bore (12) facing generally radially inward toward and encircling at least a portion of said sealing surface (14);

a sealing element (4) located radially between and having sealing contact with said sealing surface (14) and said groove bore (12), said sealing element (4) having a seal body first end (26) and a seal body second end (28) facing in generally opposite directions away from one other, said seal body first end (26) having an inner peripheral edge (78) and an annular outer peripheral edge (80), at least one tang (32) situated in intermediate radial relation to said inner peripheral edge (78) and said annular outer peripheral edge (80) and projecting from said seal body first end (26) in a generally axial direction, said at least one tang (32) having a first circumferential end (58) facing in a generally circumferential direction, an outer peripheral surface (48) facing in a generally radially outward direction away from said rotatable shaft (10), and an inner peripheral surface (50) facing in a generally radially inward direction toward said rotatable shaft (10);

a shelf member (8) located radially outward of said rotatable shaft (10) and having a shelf (42) located radially between said rotatable shaft (10) and said at least one tang (32); and one of said seal housing (6) and said shelf member (8) providing at least one restraint (36), at least a portion of said at least one restraint (36) being in circumferential alignment with at least a portion of said at least one tang (32) and blocking rotation of said sealing element (4).

2. The rotary shaft sealing assembly (2) of claim 1, wherein said at least one restraint (36) comprises a plurality of restraints (36) arranged in a circular pattern and said at least one tang (32) comprises a plurality of tangs (32) arranged in a circular pattern, a portion of each said restraint (36) situated circumferentially between one said tang (32) and another said tang (32).

3. The rotary shaft sealing assembly (2) of claim 1, wherein said at least one restraint (36) is a pin extending in a generally radial orientation from said seal housing (6).

4. The rotary shaft sealing assembly (2) of claim 3, wherein said seal housing (6) has a mounting hole (34) situated in a generally radial orientation, and said pin has a portion thereof located within said mounting hole (34).

5. The rotary shaft sealing assembly (2) of claim 4, wherein said shelf (42) has a shelf outer surface (44) facing generally radially outward toward said inner peripheral surface (50) of said at least one tang (32) and facing generally toward said pin and blocking disengagement of said pin from said mounting hole (34).

6. The rotary shaft sealing assembly (2) of claim 1, wherein said at least one restraint (36) is a pin extending from said shelf member (8).

7. The rotary shaft sealing assembly (2) of claim 6, wherein said shelf member (8) has a mounting hole (34) and said pin has a portion thereof located within said mounting hole (34).

8. The rotary shaft sealing assembly (2) of claim 1, wherein said at least one restraint (36) is an integral feature of said shelf member (8).

9. The rotary shaft sealing assembly (2) of claim 1, wherein said shelf (42) has an inner groove wall (38) facing in a generally axial direction toward said seal body first end (26) and said shelf member (8) has an outer groove wall (40) facing in a generally axial direction toward said seal body first end (26), and said outer groove wall (40) being more distant than said inner groove wall (38) from said seal body first end (26); and said shelf (42) having a shelf axial length defined by a distance from said inner groove wall (38) to said outer groove wall (40), and said at least one tang (32) having an axial tang end (54) and an axial length defined by a distance from said axial tang end (54) to said seal body first end (26), wherein said tang axial length and said shelf axial length are substantially the same.

10. The rotary shaft sealing assembly (2) of claim 9, wherein said shelf (42) has a shelf outer surface (44) facing generally radially outward toward said inner peripheral surface (50) of said at least one tang (32) and encircled by said groove bore (12), and a corner break (53) is located between and adjacent to said shelf outer surface (44) and said inner groove wall (38).

11. The rotary shaft sealing assembly (2) of claim 10, wherein said inner peripheral surface (50) of said at least one tang (32) is blended to said seal body first end (26) by a tang fillet (52) located between and adjacent to said inner peripheral surface (50) and said seal body first end (26), and said corner break (53) faces generally toward said tang fillet (52).

12. The rotary shaft sealing assembly (2) of claim 9, wherein said at least one tang (32) has an axial tang end (54) facing in a generally axial direction toward said outer groove wall (40) and said outer groove wall (40) faces generally toward said axial tang end (54).

13. The rotary shaft sealing assembly (2) of claim 1, wherein said first circumferential end (58) faces toward said at least one restraint (36) and is blended to said seal body first end (26) by a first end fillet (62) located between and adjacent to said first circumferential end (58) and said seal body first end (26).

14. The rotary shaft sealing assembly (2) of claim 13, wherein said at least one tang (32) has a second circumferential end (60) facing in a generally circumferential direction away from said first circumferential end (58), and said second circumferential end (60) is blended to said seal body first end (26) by a second end fillet (64) located between and adjacent to said second circumferential end (60) and said seal body first end (26).

15. The rotary shaft sealing assembly (2) of claim 1, wherein said inner peripheral surface (50) of said at least one tang (32) is blended to seal body first end (26) by a tang fillet (52) located between and adjacent to said inner peripheral surface (50) and said seal body first end (26).

16. The rotary shaft sealing assembly (2) of claim 1, wherein said shelf member (8) has a pilot surface (46) facing radially outward toward, encircled by, and adjoining said seal housing (6) and locating said seal housing (6) and said shelf member (8) radially with respect to one another.

17. The rotary shaft sealing assembly (2) of claim 16, wherein said groove bore (12) faces toward, encircles, and adjoins said pilot surface (46).

18. The rotary shaft sealing assembly (2) of claim 1, wherein said shelf member (8) has a shelf member indexing surface (57) facing in a generally axial direction toward said seal housing (6) and said seal housing (6) has a housing indexing surface (56) facing in a generally axial direction toward said shelf member (8), said housing indexing surface (56) and said shelf member indexing surface (57) facing in generally opposite directions toward one another, abutting one another, and locating said seal housing (6) and said shelf member (8) axially with respect to one another.

19. The rotary shaft sealing assembly (2) of claim 1, wherein said seal housing (6) has a housing groove wall (30) facing in a generally axial direction toward said seal body second end (28), and arranged to abut said seal body second end (28).

20. The rotary shaft sealing assembly (2) of claim 1, wherein said seal housing (6) has a housing groove wall (30) facing in a generally axial direction toward said seal body second end (28), and the sealing assembly (2) further comprising a plastic washer (110) interposed between and contacting said seal body second end (28) and said housing groove wall (30).

21. The rotary shaft sealing assembly (2) of claim 1, wherein the sealing contact between said sealing element (4) and said sealing surface (14) of said rotatable shaft (10) is established by a dynamic sealing surface (20) of said sealing element (4) that faces radially inward toward and encircles said sealing surface (14) and is situated in intermediate relation to said seal body first end (26) and said seal body second end (28), said sealing element (4) having an inlet curvature (74) of generally convex form situated in intermediate relation to said dynamic sealing surface (20) and said seal body second end (28) and adjacent to at least a portion of said dynamic sealing surface (20), said inlet curvature (74) being more distant than said dynamic sealing surface (20) from said seal body first end (26) when viewed in longitudinal cross-section.

22. The rotary shaft sealing assembly (2) of claim 21, wherein said sealing element (4) has an angled transitional geometry (84) located between and adjacent to said seal body first end (26) and said dynamic sealing surface (20), said angled transitional geometry (84) being closer than said dynamic sealing surface (20) to said shelf (42).

23. The rotary shaft sealing assembly (2) of claim 1, further comprising a static seal (24) providing sealing between said seal housing (6) and said shelf member (8).

24. The rotary shaft sealing assembly (2) of claim 1, wherein the sealing contact between said sealing element (4) and said sealing surface (14) of said rotatable shaft (10) is established by a dynamic sealing surface (20) of said sealing element (4) that faces radially inward toward and encircles said sealing surface (14) and is situated in intermediate relation to said seal body first end (26) and said seal body second end (28), said sealing element (4) having an inlet curvature (74) of generally convex form situated in intermediate relation to said dynamic sealing surface (20) and said seal body first end (26) and adjacent to at least a portion of said dynamic sealing surface (20), said inlet curvature (74) being closer than said dynamic sealing surface (20) to said seal body first end (26) when viewed in longitudinal cross-section.

25. The rotary shaft sealing assembly (2) of claim 9, wherein said sealing element (4) partitions a first fluid (16) having a pressure from a second fluid (18) having a pressure, said seal body first end (26), said at least one tang (32), said at least one restraint (36) and said shelf (42) being exposed to the first fluid (16) and said seal body second end (28) being exposed to the second fluid (18), wherein when the second fluid pressure is greater than the first fluid pressure, said inner groove wall (38) supports said seal body first end (26) and said outer groove wall (40) supports said axial tang end (54), and wherein when the first fluid pressure is greater than the second fluid pressure, said seal body first end (26) is not supported by said inner groove wall (38) and said axial tang end (54) is not supported by said outer groove wall (40).

26. The rotary shaft sealing assembly (2) of claim 1, wherein said sealing element (4) partitions a first fluid (16) having a pressure from a second fluid (18) having a pressure, said seal body first end (26), said at least one tang (32), said at least one restraint (36) and said shelf (42) being exposed to said first fluid (16);

a piston (88) in fluid communication with said first fluid (16) and said second fluid (18); and a spring (96) acting on said piston (88) toward said first fluid (16) and causing said pressure of said second fluid (18) to be less than said pressure of said first fluid (16).

27. The rotary shaft sealing assembly (2) of claim 1, further comprising:

said sealing element (4) partitions a first fluid (16) having a pressure from a second fluid (18) having a pressure, and said seal body first end (26), said at least one tang (32), said at least one restraint (36) and said shelf (42) being exposed to said first fluid (16);

a reservoir housing (92) having a reservoir bore (90);

a piston (88) having a piston rod (104), said piston (88) being located at least partially within said reservoir bore (90) and partitioning said first fluid (16) from said second fluid (18);

a first hydraulic area defined between said piston rod (104) and said reservoir bore (90) in fluid communication with said first fluid (16);

a second hydraulic area defined by said reservoir bore (90) in fluid communication with said second fluid (18), said second hydraulic area being larger than said first hydraulic area, and said pressure of said second fluid (18) being produced by said first fluid (16) acting on said first hydraulic area and reacted by said second hydraulic area, said pressure of said second fluid (18) being less than said pressure of said first fluid (16).

28. The rotary shaft sealing assembly (2) of claim 1, wherein said sealing element (4) partitions a first fluid (16) having a pressure at least at atmospheric pressure from a second fluid (18) having a pressure, said seal body first end (26), said at least one tang (32), said at least one restraint (36) and said shelf (42) being exposed to said first fluid (16);

a chamber (83) containing the second fluid (18);

a valve (85) providing access to the chamber (83); and a vacuum pump (87) removably connected to the valve (85), wherein the vacuum pump (87) is capable of creating a vacuum in the chamber (83) to ensure that the pressure of the second fluid (18) is less than the pressure of the first fluid (16).

29. A rotary shaft sealing assembly (2) comprising:

a rotatable shaft (10) having a sealing surface (14) of generally cylindrical form facing generally radially outward;

a seal housing (6) of annular form located radially outward of and encircling said rotatable shaft (10) and having a groove bore (12) facing generally radially inward toward and encircling at least a portion of said sealing surface (14);

a sealing element (4) located radially between and having sealing contact with said sealing surface (14) and said groove bore (12), said sealing element (4) having a seal body first end (26) and a seal body second end (28) facing in generally opposite directions away from one other, at least one tang (32) projecting from said seal body first end (26) in a generally axial direction away from said seal body second end (28), said at least one tang (32) having a first circumferential end (58) facing in a generally circumferential direction, an outer peripheral surface (48) facing in a generally radial outward direction away from said rotatable shaft (10), and an inner peripheral surface (50) facing in a generally radial inward direction toward said rotatable shaft (10);

a shelf member (8) located radially outward of said rotatable shaft (10) and having a shelf (42) located radially between said rotatable shaft (10) and said at least one tang (32), said shelf (42) having a shelf outer surface (44) facing generally radially outward toward said inner peripheral surface (50) of said at least one tang (32);

at least one mounting hole (34) formed in said seal housing (6) or said shelf member (8);

at least one restraint (36) having a portion thereof located within said at least one mounting hole (34) and having a portion thereof located in circumferential alignment with a portion of said at least one tang (32) and blocking rotation of said sealing element (4); and said shelf (42) located radially between said rotatable shaft (10) and said at least one restraint (36), and said shelf outer surface (44) facing generally toward at least a portion of said at least one restraint (36) and blocking said at least one restraint (36) from contacting said rotatable shaft (10).

30. The rotary shaft sealing assembly (2) of claim 29, wherein said shelf member (8) having an outer groove wall (40) facing said seal body first end (26), said shelf having an inner groove wall (38) facing said seal body first end (26), and said at least one tang (32) having an axial tang end (54) facing said outer groove wall (40), wherein said at least one tang (32) has an axial length defined by a distance from said axial tang end (54) to said seal body first end (26) and said shelf (42) has an axial length defined by a distance from said inner groove wall (38) to said outer groove wall (40), and said tang axial length and said shelf axial length are substantially the same.

31. A rotary shaft sealing assembly (2) comprising:

a rotatable shaft (10) having a sealing surface (14) of generally cylindrical form facing generally radially outward;

a seal housing (6) of annular form located radially outward of and encircling said rotatable shaft (10) and having a groove bore (12) facing generally radially inward toward and encircling at least a portion of said sealing surface (14), said seal housing (6) having a housing groove wall (30) facing in a generally axial direction;

a shelf member (8) located radially outward of said rotatable shaft (10) and having a shelf (42) with a shelf outer surface (44) facing generally radially outward, said shelf member (8) having an outer groove wall (40) and an inner groove wall (38), the outer and inner groove walls facing axially toward said housing groove wall (30) and axially offset from one another with said inner groove wall (38) being nearer to said housing groove wall (30);

a sealing element (4) located radially between and having sealing contact with said sealing surface (14) and said groove bore (12), said sealing element (4) having a seal body first end (26) and a seal body second end (28) facing axially in generally opposite directions away from one another, at least one tang (32) projecting from said seal body first end (26) in a generally axial direction toward said outer groove wall (40) and having an axial tang end (54) generally facing said outer groove wall (40), said at least one tang (32) having a first circumferential end (58) facing in a generally circumferential direction;

at least one restraint (36) extending from said seal housing (6) or said shelf member (8), having a portion thereof located in circumferential alignment with a portion of said at least one tang (32) and blocking rotation of said sealing element (4), wherein said sealing element (4) partitions a first fluid (16) having a pressure from a second fluid (18) having a pressure, said seal body first end (26), said at least one tang (32), said at least one restraint (36) and said shelf (42) being exposed to the first fluid (16) and said seal body second end (28) being exposed to the second fluid (18);

wherein when the second fluid pressure is greater than the first fluid pressure, said inner groove wall (38) supports said seal body first end (26) and said outer groove wall (40) supports said axial tang end (54), and wherein when the first fluid pressure is greater than the second fluid pressure, said housing groove wall (30) supports said seal body second end (28), said seal body first end (26) is not supported by said inner groove wall (38) and said axial tang end (54) is not supported by said outer groove wall (40).

32. The rotary shaft sealing assembly (2) of claim 31, wherein said shelf (42) is located radially between said rotatable shaft (10) and said at least one restraint (36), and said shelf outer surface (44) faces generally toward at least a portion of said at least one restraint (36) and blocks said at least one restraint (36) from contacting said rotatable shaft (10).

33. The rotary shaft sealing assembly (2) of claim 31, wherein said at least one tang (32) has an axial length defined by a distance from said axial tang end (54) to said seal body first end (26) and said shelf (42) has an axial length defined by a distance from said inner groove wall (38) to said outer groove wall (40), and said tang axial length and said shelf axial length are substantially the same.

* * * * *